United States Patent
Takada

(10) Patent No.: US 9,369,734 B2
(45) Date of Patent: Jun. 14, 2016

(54) METHOD AND APPARATUS FOR ENCODING AND DECODING BY WAVELET TRANSFORM

(71) Applicant: NEC Corporation, Minato-ku, Tokyo (JP)

(72) Inventor: Jun Takada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/414,554

(22) PCT Filed: Apr. 15, 2013

(86) PCT No.: PCT/JP2013/002537
§ 371 (c)(1),
(2) Date: Jan. 13, 2015

(87) PCT Pub. No.: WO2014/013647
PCT Pub. Date: Jan. 23, 2014

(65) Prior Publication Data
US 2015/0172722 A1    Jun. 18, 2015

(30) Foreign Application Priority Data

Jul. 19, 2012    (JP) .................................. 2012-160783

(51) Int. Cl.
| G06K 9/46 | (2006.01) |
| H04N 19/63 | (2014.01) |
| H04N 19/91 | (2014.01) |
| H04N 19/64 | (2014.01) |
| H04N 19/93 | (2014.01) |

(52) U.S. Cl.
CPC ............... *H04N 19/63* (2014.11); *H04N 19/64* (2014.11); *H04N 19/91* (2014.11); *H04N 19/93* (2014.11)

(58) Field of Classification Search
USPC .......................... 382/240, 248, 251, 235, 232; 375/240.01, 240.19
See application file for complete search history.

(56) References Cited

U.S. PATENT DOCUMENTS

| 8,031,951 B2* | 10/2011 | Takada | H04N 19/63 382/232 |
| 8,218,645 B2* | 7/2012 | Takada | H04N 1/41 375/240.01 |
| 8,265,402 B2* | 9/2012 | Takada | H04N 19/63 382/232 |

FOREIGN PATENT DOCUMENTS

| JP | 2004032760 A | 1/2004 |
| JP | 4424522 B2 | 12/2009 |

(Continued)

OTHER PUBLICATIONS

Matsumura, et al., "Wavelet Image Coding Using Power Adaptive Vector Quantization", the 10th Picture Coding Symposium of Japan (PCSJ95), pp. 121-122, in the Specification as "Method for Vector Quantization of Wavelet Transform Image by Subband Hierarchy and Electric Power Class" with English Abstract.

(Continued)

*Primary Examiner* — Anh Do

(57) ABSTRACT

A coefficient encoding unit extracts, as a coefficient group, a group of coefficients (wavelet transform coefficients) located spatially at the same positions from a plurality of high-frequency subbands generated by wavelet transform of a two-dimensional signal, and encodes the group. The coefficient encoding unit has: a unit for collectively encoding the wavelet transform coefficients included in the coefficient group; a unit for individually encoding; a unit for extracting, as a mode determination reference coefficient group, a group of already-encoded wavelet transform coefficients located spatially in neighborhood of the encoding target coefficient group; and a unit for comparing the sum of the absolute values of the wavelet transform coefficients included in the mode determination reference coefficient group with a predetermined threshold, and determining whether to collectively encode or individually encode the wavelet transform coefficients included in the encoding target coefficient group.

13 Claims, 19 Drawing Sheets

(56) References Cited

FOREIGN PATENT DOCUMENTS

| | | |
|---|---|---|
| JP | 4650592 B1 | 12/2010 |
| WO | 2008007760 A1 | 1/2008 |
| WO | 2011007478 A1 | 1/2011 |

OTHER PUBLICATIONS

International Search Report for PCT Application No. PCT/JP2013/002537, mailed on May 14, 2013.

* cited by examiner

FIG. 2

| LL | LH | LL | LH | LL | LH |
|----|----|----|----|----|----|
| HL | HH | HL | HH | HL | HH |
| LL | LH | LL | LH | LL | LH |
| HL | HH | HL | HH | HL | HH |

FIG. 3

| LL | LH | LL | LH | LL | LH |
|----|----|----|----|----|----|
| HL | HH | HL | HH | HL | HH |
| LL | LH | LL | LH | LL | LH |
| HL | HH | HL | HH | HL | HH |

FIG. 4

| LL | LH | LL | LH | LL | LH |
|----|----|----|----|----|----|
| HL | HH | HL | HH | HL | HH |
| LL | LH | LL | LH | LL | LH |
| HL | HH | HL | HH | HL | HH |

FIG. 5

| LL | LH | LL | LH | LL | LH |
|----|----|----|----|----|----|
| HL | HH | HL | HH | HL | HH |
| LL | LH | LL | LH | LL | LH |
| HL | HH | HL | HH | HL | HH |

FIG. 19

Prior Art

| F0 LL | F2 HL | F5 HL | F8 HL |
| F1 LH | F3 HH | | |
| F4 LH | F6 HH | | |
| F7 LH | | F9 HH | |

METHOD AND APPARATUS FOR ENCODING AND DECODING BY WAVELET TRANSFORM

This application is a National Stage Entry of PCT/JP2013/002537 filed on Apr. 15, 2013, which claims priority from Japanese Patent Application 2012-160783 filed on Jul. 19, 2012, the contents of all of which are incorporated herein by reference, in their entirety.

TECHNICAL FIELD

The present invention relates to encoding and decoding of two-dimensional signals. In particular, the present invention relates to a method and apparatus for encoding and decoding of two-dimensional signals by utilizing wavelet transform, and also relates to a computer program therefor.

BACKGROUND ART

Wavelet transform encoding method is known as one of the methods for high-efficiency encoding of two-dimensional signals represented by image signals.

In the wavelet transform encoding method, first, wavelet transform is applied to a two-dimensional signal. The wavelet transform is a kind of subband encoding, which results in N-hierarchy band division by repeating subband division at the low-frequency side for band division in horizontal and vertical directions, respectively. Such kind of band division is called octave division. In the case of division up to three hierarchies, 10 subbands are available as shown in FIG. 19.

In FIG. 19, F0 to F3 are subbands of the lowest hierarchy; F4 to F6 are subbands of the hierarchy thereabove; and F7 to F9 are subbands of the highest hierarchy. Further, F1, F4 and F7 are subbands filtered through a lowpass filter in a horizontal direction and through a highpass filter in a vertical direction; F2, F5 and F8 are subbands filtered through a highpass filter in a horizontal direction and through a lowpass filter in a vertical direction; and F3, F6 and F9 are subbands filtered through a highpass filter in both horizontal and vertical directions. Further, F0 is called the lowest-frequency subband and, other than F0, F1 to F9 are called high-frequency subbands.

A wavelet transform coefficient is included in each of the subbands F0 to F9. In the present description, a wavelet transform coefficient called LH is included in subbands such as F1, F4 and F7 filtered through a lowpass filter in the horizontal direction and through a highpass filter in the vertical direction. Further, a wavelet transform coefficient called HL is included in subbands such as F2, F5 and F8 filtered through a highpass filter in the horizontal direction and through a lowpass filter in the vertical direction. Further, a wavelet transform coefficient called HH is included in subbands such as F3, F6 and F9 filtered through a highpass filter in both the horizontal and vertical directions. Further, a wavelet transform coefficient called LL is included in the lowest-frequency subband F0. Furthermore, the same coordinates are assigned to the wavelet transform coefficients LH, HL and HH of the same spatial coordinates in a plurality of high-frequency subbands of the same hierarchy to be expressed, for example, as LH(i, j), HL(i, j) and HH(i, j). Therein, x represents the horizontal direction, and y represents the vertical direction; thus, the coordinates are expressed as (x, y).

When wavelet transform is carried out in the above manner, the electric power is inclined to the wavelet transform coefficient LL included in the lowest-frequency subband, and the wavelet transform coefficients LH, HL and HH included in the high-frequency subbands become approximately zero in value. Therefore, it is possible to compress the amount of information by utilizing variable-length codes, the code length of which becomes shorter as the value gets closer to zero, to encode the wavelet transform coefficients LH, HL and HH included in the high-frequency subbands. Further, because quantizing the wavelet transform coefficients LH, HL and HH increases the number of the wavelet transform coefficients of zero, it is possible to further highly compress the amount of information by concomitantly utilizing run length compression or encoding.

Herein, as methods for encoding the wavelet transform coefficients included in the high-frequency subbands, there are a method of respectively encoding LH, HL and HH such as JPEG2000 (ISO-15444-1/ITU-T Rec. 800), and a method of grouping LH, HL and HH located spatially at the same position within a plurality of subbands belonging to the same hierarchy and encoding for each group as shown in Patent Documents 1 and 2 and Non-Patent Document 1. The present invention relates to improvement of the latter method.

On the other hand, in wavelet transform decoding, the original two-dimensional signal is generated by inputting the code string created by wavelet transform encoding, and following the procedure opposite to the encoding.

The method of encoding by grouping LH, Hl and HH located spatially at the same position within the LH subband, HL subband and HH subband belonging to the same hierarchy is further classified roughly into: a method of individually encoding the plurality of wavelet transform coefficients included in the group (hereinafter, referred to as the individual coefficient encoding method); and a method of collectively encoding the plurality of wavelet transform coefficients included in the group (hereinafter, referred to as the multidimensional coefficient encoding method).

An example of the individual coefficient encoding method is described in Patent Document 2. In Patent Document 2, a group of LH, HL and HH located spatially at the same position is extracted from the LH subband, the HL subband and the HH subband, and LH, HL and HH are individually encoded into variable-length codes in this order by using Golomb-Rice code.

An example of the multidimensional coefficient encoding method is described in Patent Document 1. In Patent Document 1, a group of LH, HL and HH located spatially at the same position is extracted from the LH subband, the HL subband and the HH subband, and the three coefficients LH, HL and HH are collectively encoded into one code. To be specific, it is determined whether or not LH, HL and HH are zero, and discrimination information of 1 bit for each is generated. Next, the discrimination information are coupled for each group to generate flag information of multiple bit length, and this flag information is encoded into a variable-length code. Thus, a compression ratio when all of the coefficients included in a group are zero in value is increased. However, regarding a non-zero coefficient, the value of the coefficient is encoded into a variable-length code separately.

Another example of the multidimensional coefficient encoding method is described in Non-Patent Document 1. In Non-Patent Document 1, the LH, HL and HH coefficients spatially in neighborhood in the same hierarchy are collected to generate a multidimensional vector and encode it. To be specific, by classifying depending on the electric power of the vector and applying vector quantization depending on the class, the compression efficiency of the coefficient is increased. Further, by eliminating a vector with all coefficients of zero in value as an invalid vector from the encoding target, the compression ratio in high compression with many zero coefficients is increased.

Patent Document 1: Japanese Patent No. 4424522
Patent Document 2: Japanese Patent No. 4650592
Non-Patent Document 1: Matsumura, et al., "Method for Vector Quantization of Wavelet Transform Image by Subband Hierarchy and Electric Power Class" the 10th Picture Coding Symposium of Japan (PCSJ95), pp. 121-122

As described above, as a method for encoding LH, HL and HH located spatially at the same position within the LH subband, HL subband and HH subband belonging to the same hierarchy, there are two methods of the individual coefficient encoding method and the multidimensional coefficient encoding method. There is a two-dimensional signal that a compression ratio becomes higher when the signal is encoded by the multidimensional coefficient encoding method, whereas there is a two-dimensional signal that a compression ratio becomes higher when the signal is encoded by the individual coefficient encoding method. Further, there is a two-dimensional signal which contains in one two-dimensional signal both a part that a compression ratio becomes higher when the signal is encoded by the multidimensional coefficient encoding method and a part that a compression ratio becomes higher when the signal is encoded by the individual coefficient encoding method. Therefore, by a method in which it is defined for an entire two-dimensional signal whether to collectively encode or individually encode a plurality of wavelet transform coefficients of the encoding target, it is difficult to encode at a good compression ratio.

SUMMARY

An object of the present invention is to provide a wavelet transform encoding apparatus which solves the abovementioned problem, namely, the problem that it is difficult to encode at a good compression ratio by a method in which it is defined for a entire two-dimensional signal whether to collectively encode or individually encode a plurality of wavelet transform coefficients located spatially at the same position.

A wavelet transform encoding apparatus as an aspect of the present invention includes:
  a wavelet transform unit for decomposing a two-dimensional signal into subbands, which are a plurality of frequency regions; and
  a coefficient encoding unit for encoding wavelet transform coefficients of the subbands,
    wherein the coefficient encoding unit includes:
    a coefficient group extracting unit for extracting, as a coefficient group, a group of a plurality of wavelet transform coefficients located spatially at same positions from LH, HL and HH subbands belonging to a same hierarchy;
    a multidimensional coefficient encoding unit for collectively encoding the plurality of wavelet transform coefficients included in the extracted coefficient group;
    an individual coefficient encoding unit for individually encoding the plurality of wavelet transform coefficients included in the extracted coefficient group;
    a mode determination reference coefficient extracting unit for extracting, as a mode determination reference coefficient group, a group of a plurality of already-encoded wavelet transform coefficients located spatially in neighborhood of the extracted coefficient group from the LH, HL and HH subbands belonging to the same hierarchy; and
    an encoding method determining unit for comparing a sum of absolute values of the plurality of wavelet transform coefficients included in the extracted mode determination reference coefficient group with a predetermined first threshold, and determining whether to use the multidimensional coefficient encoding unit or the individual coefficient encoding unit to encode the plurality of wavelet transform coefficients included in the extracted coefficient group.

A wavelet transform decoding apparatus as another aspect of the present invention is a decoding apparatus in which an input is a code string obtained by variable-length encoding of wavelet transform coefficients of a plurality of subbands obtained by wavelet transform,
  the wavelet transform decoding apparatus comprising a coefficient decoding unit for decoding wavelet transform coefficients for each group including a plurality of wavelet transform coefficients located spatially at same positions within a plurality of high-frequency subbands belonging to a same hierarchy from the code string,
    wherein the coefficient decoding unit includes:
    a multidimensional coefficient decoding unit for collectively decoding the plurality of wavelet transform coefficients included in the group;
    an individual coefficient decoding unit for individually decoding the plurality of wavelet transform coefficients included in the group;
    a mode determination reference coefficient extracting unit for extracting, as a mode determination reference coefficient group, a group of a plurality of already-decoded wavelet transform coefficients located spatially in neighborhood of the group of a decoding target from LH, HL and HH subbands belonging to a same hierarchy; and
    a decoding method determining unit for comparing a sum of absolute values of the plurality of wavelet transform coefficients included in the extracted mode determination reference coefficient group with a predetermined first threshold, and determining whether to use the multidimensional coefficient decoding unit or the individual coefficient decoding unit to decode the plurality of wavelet transform coefficients included in the group of the decoding target.

A wavelet transform encoding method as another aspect of the present invention includes:
  decomposing a two-dimensional signal into subbands, which are a plurality of frequency regions; and
  encoding wavelet transform coefficients of the subbands,
    wherein the encoding of the wavelet transform coefficients of the subbands includes:
    extracting, as a coefficient group, a group of a plurality of wavelet transform coefficients located spatially at same positions from LH, HL and HH subbands belonging to a same hierarchy;
    extracting, as a mode determination reference coefficient group, a group of a plurality of already-encoded wavelet transform coefficients located spatially in neighborhood of the extracted coefficient group from the LH, HL and HH subbands belonging to the same hierarchy;
    comparing a sum of absolute values of the plurality of wavelet transform coefficients included in the extracted mode determination reference coefficient group with a predetermined first threshold, and determining whether to use a multidimensional coefficient encoding method or an individual coefficient encoding method to encode the plurality of wavelet transform coefficients included in the extracted coefficient group;
    when it is determined to encode by the multidimensional coefficient encoding method, collectively encoding the plurality of wavelet transform coefficients included in the extracted coefficient group; and when it is determined to encode by the individual coefficient encoding method, individually encoding the plurality of wavelet transform coefficients included in the extracted coefficient group.

A wavelet transform decoding method as another aspect of the present invention includes:

decoding wavelet transform coefficients for each group including a plurality of wavelet transform coefficients located spatially at same positions within a plurality of high-frequency subbands belonging to a same hierarchy, from a code string obtained by variable-length encoding of wavelet transform coefficients of a plurality of subbands obtained by wavelet transform, wherein the decoding the wavelet transform coefficients for each group includes:

extracting, as a mode determination reference coefficient group, a group of a plurality of already-decoded wavelet transform coefficients located spatially in neighborhood of the group of a decoding target from LH, HL and HH subbands belonging to a same hierarchy;

comparing a sum of absolute values of the plurality of wavelet transform coefficients included in the extracted mode determination reference coefficient group with a predetermined first threshold, and determining whether to use a multidimensional coefficient decoding method or an individual coefficient decoding method to decode the plurality of wavelet transform coefficients included in the group of the decoding target;

when it is determined to decode by the multidimensional coefficient decoding method, collectively decoding the plurality of wavelet transform coefficients included in the group; and when it is determined to decode by the individual coefficient decoding method, individually decoding the plurality of wavelet transform coefficients included in the group.

With the configurations described above, the present invention allows encoding at a good compression ratio on various two-dimensional signals such as a two-dimensional signal for which it is desirable to collectively encode a plurality of wavelet transform coefficients located spatially at the same position, a two-dimensional signal for which it is desirable to individually encode, and a two-dimensional signal containing both a part for which it is desirable to collectively encode and a part for which it is desirable to individually encode.

BRIEF DESCRIPTION OF DRAWINGS

FIG. 2 is an explanatory diagram of a group of wavelet transform coefficients LH, HL and HH located spatially at the same position and mode determination reference coefficients extracted at the time of encoding the group;

FIG. 3 is an explanatory diagram of other multiple wavelet transform coefficients referred to for seeking an encoding parameter at the time of encoding of the wavelet transform coefficient LH into a variable-length code;

FIG. 4 is an explanatory diagram of other multiple reference wavelet transform coefficients for seeking an encoding parameter at the time of encoding of the wavelet transform coefficient HL into a variable-length code;

FIG. 5 is an explanatory diagram of other multiple reference wavelet transform coefficients for seeking an encoding parameter at the time of encoding of the wavelet transform coefficient HH into a variable-length code;

FIG. 19 is an explanatory diagram of three-hierarchy wavelet transform.

EXEMPLARY EMBODIMENTS

Next, exemplary embodiments of the present invention will be described in detail with reference to the accompanying drawings.

[First Exemplary Embodiment]

Figure 1:
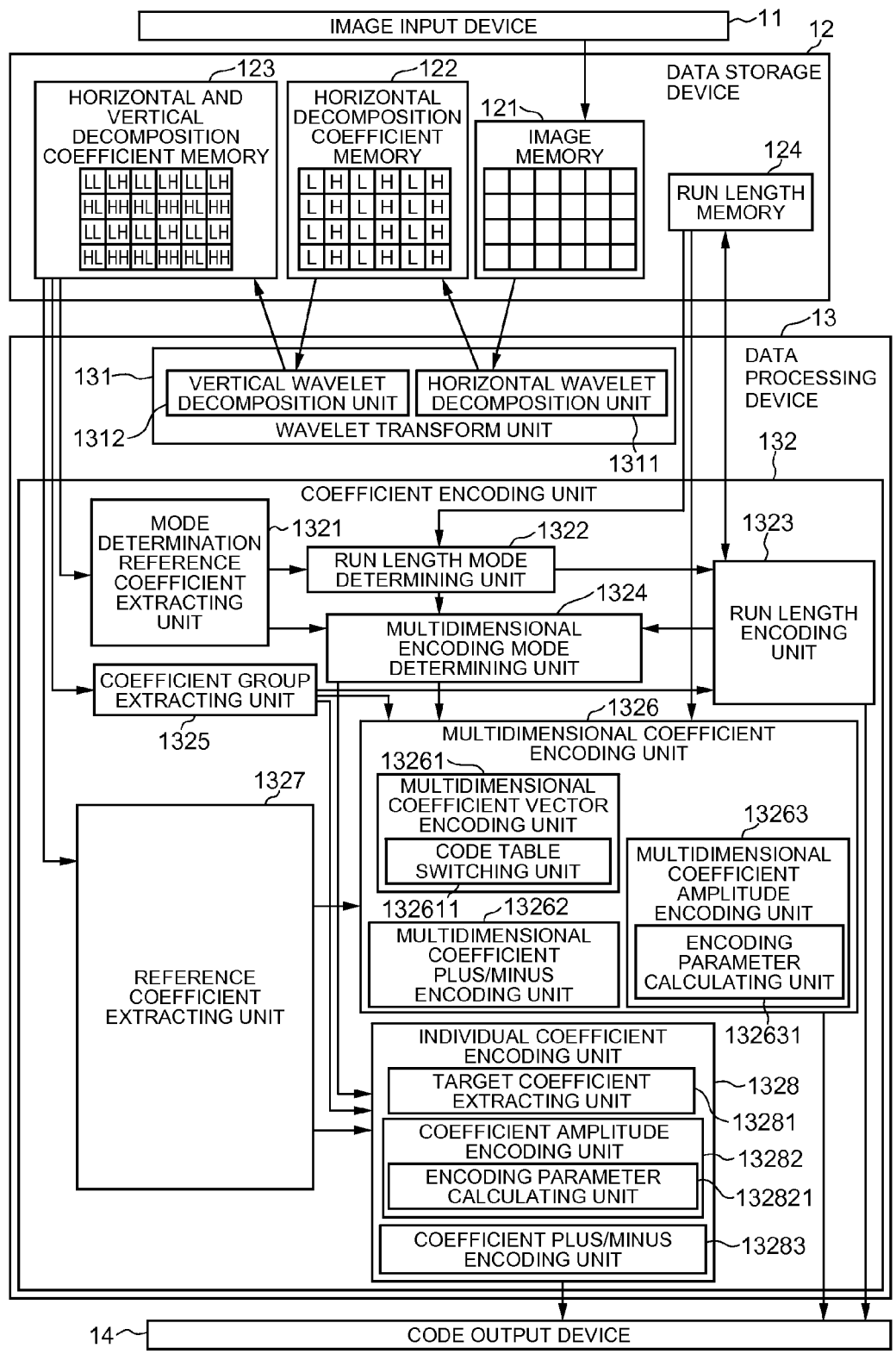
FIG. 1 is a block diagram of a wavelet transform encoding apparatus in accordance with a first exemplary embodiment of the present invention.

In reference to FIG. 1, a first exemplary embodiment of the present invention is comprised of an image input device 11, a data storage device 12, a data processing device 13 operating under program control, and a code output device 14.

{Explanation of Configuration}

The image input device 11 is a device for inputting an image as a two-dimensional signal and is comprised of, for example, a camera, a communication device, and the like.

The data storage device 12 includes an image memory 121, a horizontal decomposition coefficient memory 122, a horizontal and vertical decomposition coefficient memory 123, and a run length memory 124.

The image memory 121 stores the image inputted from the image input device 11.

The horizontal decomposition coefficient memory 122 stores horizontal decomposition coefficients acquired by applying horizontal wavelet decomposition to the inputted image stored in the image memory 121.

The horizontal and vertical decomposition coefficient memory 123 stores horizontal and vertical decomposition coefficients acquired by applying vertical wavelet decomposition to the horizontal decomposition coefficients stored in the horizontal decomposition coefficient memory 122.

The data processing device 13 includes a wavelet transform unit 131, and a coefficient encoding unit 132.

The wavelet transform unit 131 includes a horizontal wavelet decomposition unit 1311, and a vertical wavelet decomposition unit 1312.

The horizontal wavelet decomposition unit 1311 is configured by a 5-3 integer-type filter, a 9-7 integer-type filter, or the like. Reading out the inputted image stored in the image memory 121 in a raster scanning order line by line in the horizontal direction and processing the same, the horizontal wavelet decomposition unit 1311 generates the horizontal decomposition coefficients and stores the same into the horizontal decomposition coefficient memory 122. As shown in the horizontal decomposition coefficient memory 122, "H" indicates horizontal decomposition coefficients on the high-frequency side, whereas "L" indicates horizontal decomposition coefficients on the low-frequency side.

As well as the horizontal wavelet decomposition unit 1311, the vertical wavelet decomposition unit 1312 is configured by a 5-3 integer-type filter, a 9-7 integer-type filter, or the like. Reading out the horizontal decomposition coefficients stored in the horizontal decomposition coefficient memory 122 line by line in the vertical direction and processing the same, the vertical wavelet decomposition unit 1312 generates LH, HL, HH and LL, and stores the same into the horizontal and vertical decomposition coefficient memory 123.

Thus, the horizontal wavelet decomposition unit 1311 and the vertical wavelet decomposition unit 1312 configure the wavelet transform unit 131. Herein, after the horizontal wavelet decomposition is applied to a whole input image, all the horizontal decomposition coefficients may once be stored in the horizontal decomposition coefficient memory 122, and then, read out from the horizontal decomposition coefficient memory 122 to undergo vertical wavelet decomposition. However, in order to speed up the processing and reduce the amount of memory, the wavelet transform coefficients LL, LH, HL and HH may also be sought successively by starting the operation of the vertical wavelet decomposition unit 1312 as soon as the horizontal wavelet decomposition unit 1311 acquires a few lines of the horizontal decomposition coefficients.

Further, in this exemplary embodiment, 1-hierarchy wavelet transform is carried out. However, it is needless to say that the present invention is also applicable to a case of carrying out 2-or-more-hierarchy wavelet transform. Then, in the case of 2-or-more-hierarchy wavelet transform, the wavelet transform coefficients of the respective hierarchies may be sought successively.

Because 1-hierarchy wavelet transform is carried out in this exemplary embodiment, the wavelet transform coefficient LL stored in the horizontal and vertical decomposition coefficient memory 123 is encoded with an encoding method such as LZW by using an encoding unit for LL (not shown), and then, outputted to the code output device 14. Further, in the case of 2-or-more-hierarchy wavelet transform, the wavelet transform coefficient LL stored in the horizontal and vertical decomposition coefficient memory 123 is recursively applied to wavelet decomposition. Then, the generated wavelet transform coefficients LH, HL and HH of the high-frequency subbands are encoded in the same manner as described below by using the coefficient encoding unit 132. On the other hand, the last remaining wavelet transform coefficient LL of the lowest-frequency subband is encoded with an encoding method such as LZW by using an encoding unit for LL (not shown), and then, outputted to the code outputting device 14.

Further, this exemplary embodiment describes a mode of encoding the LH, HL and HH coefficients outputted as a result of wavelet transform as they are, but the coefficients of the high-frequency subbands may be encoded after being subjected to a quantization process. Consequently, it is possible to further increase a compression ratio.

The coefficient encoding unit 132 encodes the wavelet transform coefficients LH, HL and HH included in the high-frequency subbands among the wavelet transform coefficients stored in the horizontal and vertical decomposition coefficient memory 123. At the time, the coefficient encoding unit 132 extracts, as coefficient groups, a plurality of groups each containing the wavelet transform coefficients LH, HL and HH located spatially at the same position within a plurality of high-frequency subbands belonging to the same hierarchy in a raster scanning order, and encodes each of the coefficient groups.

The coefficient encoding unit 132 is comprised of a mode determination reference coefficient extracting unit 1321, a run length mode determining unit 1322, a run length encoding unit 1323, a multidimensional encoding mode determining unit 1324, a coefficient group extracting unit 1325, a multidimensional coefficient encoding unit 1326, a reference coefficient extracting unit 1327, and an individual coefficient encoding unit 1328. The run length mode determining unit 1322 and the multidimensional encoding mode determining unit 1324 configure an encoding method determining unit.

The coefficient group extracting unit 1325 extracts the coefficients LH, HL and HH of the same hierarchy and the same spatial coordinate as a coefficient group to be encoded group by group in a raster scanning order.

The mode determination reference coefficient extracting unit 1321 extracts wavelet transform coefficients to be referred to for discrimination of an encoding mode. To be specific, when a group of the wavelet transform coefficients LH, HL and HH to be encoded next is a part enclosed by a thick solid line in FIG. 2, the mode determination reference coefficient extracting unit 1321 extracts the following six wavelet transform coefficients in total hatched in FIG. 2 as reference coefficients:

(1) the wavelet transform coefficient LH of the coordinate value $(i, j-1)$;

(2) the wavelet transform coefficient HL of the coordinate value $(i, j-1)$;

(3) the wavelet transform coefficient HH of the coordinate value $(i, j-1)$;

(4) the wavelet transform coefficient LH of the coordinate value $(i-1, j)$;

(5) the wavelet transform coefficient HL of the coordinate value $(i-1, j)$; and (6) the wavelet transform coefficient HH of the coordinate value $(i-1, j)$.

Herein, it is assumed that the coordinate value of the encoding target coefficient group enclosed by the thick solid line is $(i, j)$.

However, for a wavelet transform coefficient of no equivalent coordinate value, a predetermined value (e.g., 0) is used.

The run length mode determining unit 1322 determines whether or not a run length mode is entered at present and, in a case where the run length mode is entered, a run length encoding process is performed by the run length encoding unit 1323. In a case where the run length mode is not entered, the run length mode determining unit 1322 compares a sum S of the absolute values of the reference coefficients extracted by the mode determination reference coefficient extracting unit 1321 with a predetermined threshold A. Then, in a case where S is less than A, the run length mode determining unit 1322 determines to enter the run length mode, and the run length encoding process is performed by the run length encoding unit 1323. On the other hand, in a case where S is not less than A, mode determination is performed by the multidimensional encoding mode determining unit 1324.

Under the run length mode, in a case where all the coefficient groups extracted by the coefficient group extracting unit 1325 are 0, the run length encoding unit 1323 increments a run length (an initial value 1) stored in a run length memory 124. This increment of the run length brings the process on the coefficient group extracted this time to an end. On the other hand, in a case where any of the wavelet transform coefficients LH, HL and HH becomes non-zero, the run length encoding unit 1323 encodes the run length stored in the run length memory 124, for example, with a Gamma code, outputs the result to the code output device 14, and exits the run length mode, so that a process by the multidimensional encoding mode determining unit 1324 is performed.

The multidimensional encoding mode determining unit 1324 compares the sum S of the absolute values of the reference coefficients extracted by the mode determination reference coefficient extracting unit 1321 with a threshold B set to a larger value than A. In a case where S is less than B, the multidimensional encoding mode determining unit 1324 causes the multidimensional coefficient encoding unit 1326 to perform a multidimensional variable-length encoding process. In a case where S is not less than B, the multidimensional encoding mode determining unit 1324 causes the individual coefficient encoding unit 1328 to perform an individual coefficient variable-length encoding process.

At the time of encoding of the coefficients LH, HL and HH one by one, the reference coefficient extracting unit 1327 extracts reference coefficients for obtaining an encoding parameter of each of the coefficients.

In FIGS. 3 to 5, hatched coefficients represent reference coefficients extracted by the reference coefficient extracting unit 1327 at the time of encoding of the respective coefficients LH, HL and HH enclosed by thick solid lines. The reference coefficient extracting unit 1327 extracts a reference coefficient from a subband to which a wavelet transform coefficient of the encoding target belongs, and also extracts a reference coefficient from another subband in the same hierarchy. A specific example is shown below.

Assuming (i, j) is the coordinate value of the encoding target wavelet transform coefficient LH, in encoding of the coefficient LH, the following four wavelet transform coefficients shown in FIG. 3 are referred to:

(1) the wavelet transform coefficient LH of the coordinate value (i, j−1);

(2) the wavelet transform coefficient HL of the coordinate value (i, j−1);

(3) the wavelet transform coefficient HH of the coordinate value (i, j−1); and (4) the wavelet transform coefficient LH of the coordinate value (i−1, j).

However, a predetermined value (zero, for example) is utilized for wavelet transform coefficients of no corresponding coordinate values.

Assuming (i, j) is the coordinate value of the encoding target wavelet transform coefficient HL, in encoding of the coefficient HL, the following four wavelet transform coefficients shown in FIG. 4 are referred to:

(1) the wavelet transform coefficient HL of the coordinate value (i, j−1);

(2) the wavelet transform coefficient HL of the coordinate value (i−1, j);

(3) the wavelet transform coefficient HH of the coordinate value (i−1, j); and (4) the wavelet transform coefficient LH of the coordinate value (i, j).

However, a predetermined value (zero, for example) is utilized for wavelet transform coefficients of no corresponding coordinate values.

Assuming (i, j) is the coordinate value of the encoding target wavelet transform coefficient HH, in encoding of the coefficient HH, the following four wavelet transform coefficients shown in FIG. 5 are referred to:

(1) the wavelet transform coefficient HH of the coordinate value (i, j−1);

(2) the wavelet transform coefficient HH of the coordinate value (i−1, j);

(3) the wavelet transform coefficient LH of the coordinate value (i, j); and (4) the wavelet transform coefficient HL of the coordinate value (i, j).

However, a predetermined value (zero, for example) is utilized for wavelet transform coefficients of no corresponding coordinate values.

The multidimensional coefficient encoding unit 1326 carries out multidimensional variable-length encoding on a coefficient group extracted by the coefficient group extracting unit 1325. The multidimensional coefficient encoding unit 1326 is comprised of a multidimensional coefficient vector encoding unit 13261, a multidimensional coefficient plus/minus encoding unit 13262, and a multidimensional coefficient amplitude encoding unit 13263. Moreover, the multidimensional coefficient vector encoding unit 13261 is comprised of a code table switching unit 132611, and the multidimensional coefficient amplitude encoding unit 13263 is comprised of an encoding parameter calculating unit 132631.

The multidimensional coefficient vector encoding unit 13261, with respect to a coefficient group extracted by the coefficient group extracting unit 1325, classifies the absolute values of the coefficients LH, HL and HH into N classes in total (N≥3) including 0, 1, ..., and N−1 or more, carries out variable-length encoding on a three-dimensional vector composed of the class numbers of LH, HL and HH by using a variable-length code table, and outputs the result to the code output device 14. The N classes include (N−1) classes that the absolute values are 0, 1, ..., and (N−2) and a difference of the absolute values between the adjacent classes is 1, and a class that the absolute value is N−1 or more. The multidimensional coefficient vector encoding unit 13261 has a plurality of variable-length code tables of different kinds. The code table switching unit 132611 selects one variable-length code table from among the variable-length code tables based on whether or not encoding is to be performed immediately after the run length mode is exited. To be specific, immediately after the run length mode is exited, the code table switching unit 132611 selects a variable-length code table (a second variable-length code table) which does not assign a variable-length code to a vector with all the coefficient values zero, and otherwise, the code table switching unit selects a variable-length code table (a first variable-length code table) which assigns a variable-length code to a vector with all the coefficient values zero. The multidimensional coefficient vector encoding unit 13261 performs variable-length encoding by using the variable-length code table selected by the code table switching unit 132611.

After encoding by the multidimensional coefficient vector encoding unit 13261, with respect to a coefficient whose absolute value is non-zero, the multidimensional coefficient plus/minus encoding unit 13262 outputs a plus/minus sign to the code output device 14.

After encoding by the multidimensional coefficient vector encoding unit 13261, with respect to a coefficient value whose absolute value is N−1 or more, the multidimensional coefficient amplitude encoding unit 13263 carries out variable-length encoding on a value obtained by subtracting N−1 from the absolute value, and outputs the result to the code output device 14. By subtracting N−1 from the absolute value, a value to be encoded becomes a value close to 0. When there are a plurality of wavelet transform coefficients whose absolute values are N−1 or more, the multidimensional coefficient amplitude encoding unit 13263 encodes in order of LH, HL and HH in the coefficient group. As a variable-length code, a code whose code length becomes shorter as a value is closer to 0, for example, Golomb-Rice code is used.

In Golomb-Rice coding, a signal value is outputted as "a unary code"+"a k-bit fixed-length code," where k denotes an encoding parameter which gives an estimation value of significant digits. In encoding by using Golomb-Rice code, a binary number of an encoding target is divided into lower k bits and upper remaining bits, and the upper remaining bits are replaced with a unary code. For example, in encoding of a signal 00010011 (binary notation) where k=3, excluding the lower 3 bits, the upper 5 bits (00010) are replaced with a unary code, and thereafter, the lower 3 bits are outputted as they are. When a code that a bit of "1" is added to bits of "0" of a number expressed by a bit string is used as a unary code, in the above example, the numerical value of the upper 5 bits is 2, and hence, 2 bits of 0 are outputted and the string is terminated with "1." The string is added to the lower 3 bits, and "001011" is finally outputted as a code. In decoding of a Golomb-Rice code, by using the same value k as used in encoding, a binary number of a decoding target is divided into the lower k bits and the upper remaining bits, and the upper remaining bits are returned to the state before unary coding. For example, in decoding of the code "001011" obtained by encoding where k=3 in the above example, firstly, a numerical value 2 is obtained from the unary code "001" and "00010" is outputted as the upper five bits, and then, the following "011" is outputted as the lower three bits. As a result, the obtained signal 00010011 completely coincides with the original signal. Accordingly, Golomb-Rice coding is a kind of lossless compression encoding.

A Golomb-Rice code is the shortest in code length when the number of significant digits of a signal value to be encoded coincides with the value of k. The signal 00010011 in the above example has five significant digits. Therefore, when k=5, an outputted code is 110011, which is the shortest in code length. The encoding parameter calculating unit 132631 is a unit for obtaining such a value of k.

For a coefficient to be subjected to Golomb-Rice coding by the multidimensional coefficient amplitude encoding unit 13263, the encoding parameter calculating unit 132631 acquires reference coefficients from the reference coefficient extracting unit 1327 and calculates an encoding parameter k. To be specific, when LH is a coefficient to be subjected to Golomb-Rice coding by the multidimensional coefficient amplitude encoding unit 13263, the encoding parameter calculating unit 132631 divides the sum of the absolute values of the four wavelet transform coefficients shown in FIG. 3 by a predetermined value, or quantizes the sum by an operation such as right shift, thereby calculating an encoding parameter k. Further, when HL or HH is a coefficient to be subjected to Golomb-Rice coding by the multidimensional coefficient amplitude encoding unit 13263, the encoding parameter calculating unit 132631 calculates an encoding parameter k by the same method as in the case of LH based on the values of the four wavelet transform coefficients shown in FIG. 4 or 5.

The individual coefficient encoding unit 1328 individually encodes the coefficients LH, HL and HH of a coefficient group extracted by the coefficient group extracting unit 1325. The individual coefficient encoding unit 1328 is comprised of a target coefficient extracting unit 13281, a coefficient amplitude encoding unit 13282, and a coefficient plus/minus encoding unit 13283. Moreover, the coefficient amplitude encoding unit 13282 has an encoding parameter calculating unit 132821.

The target coefficient extracting unit 13281 extracts encoding target coefficients from a coefficient group in a predetermined order. For example, with respect to the coefficient group enclosed by the thick line in FIG. 2, the target coefficient extracting unit 13281 firstly extracts LH from the group, next extracts HL, and finally extracts HH.

The coefficient amplitude encoding unit 13282 performs Golomb-Rice coding on the absolute value of each of the coefficients LH, HL and HH extracted by the target coefficient extracting unit 13281, and outputs the result to the code output device 14.

For the coefficients LH, HL and HH to be subjected to Golomb-Rice coding by the coefficient amplitude encoding unit 13282, the encoding parameter calculating unit 132821 acquires reference coefficients from the reference coefficient extracting unit 1327, and calculates encoding parameters k. A method for calculating an encoding parameter k by the encoding parameter calculating unit 132821 is the same as the method by the encoding parameter calculating unit 132631.

When the coefficient LH, HL, HH extracted by the target coefficient extracting unit 13281 is non-zero, the coefficient plus/minus encoding unit 13282 outputs the plus/minus sign thereof to the code output device 14.

The code output device 14 is configured by a storage device such as a magnetic disk device storing a generated code, a communication device transmitting a generated code to a remote place, or the like.

{Explanation of Behavior}

Figure 6:
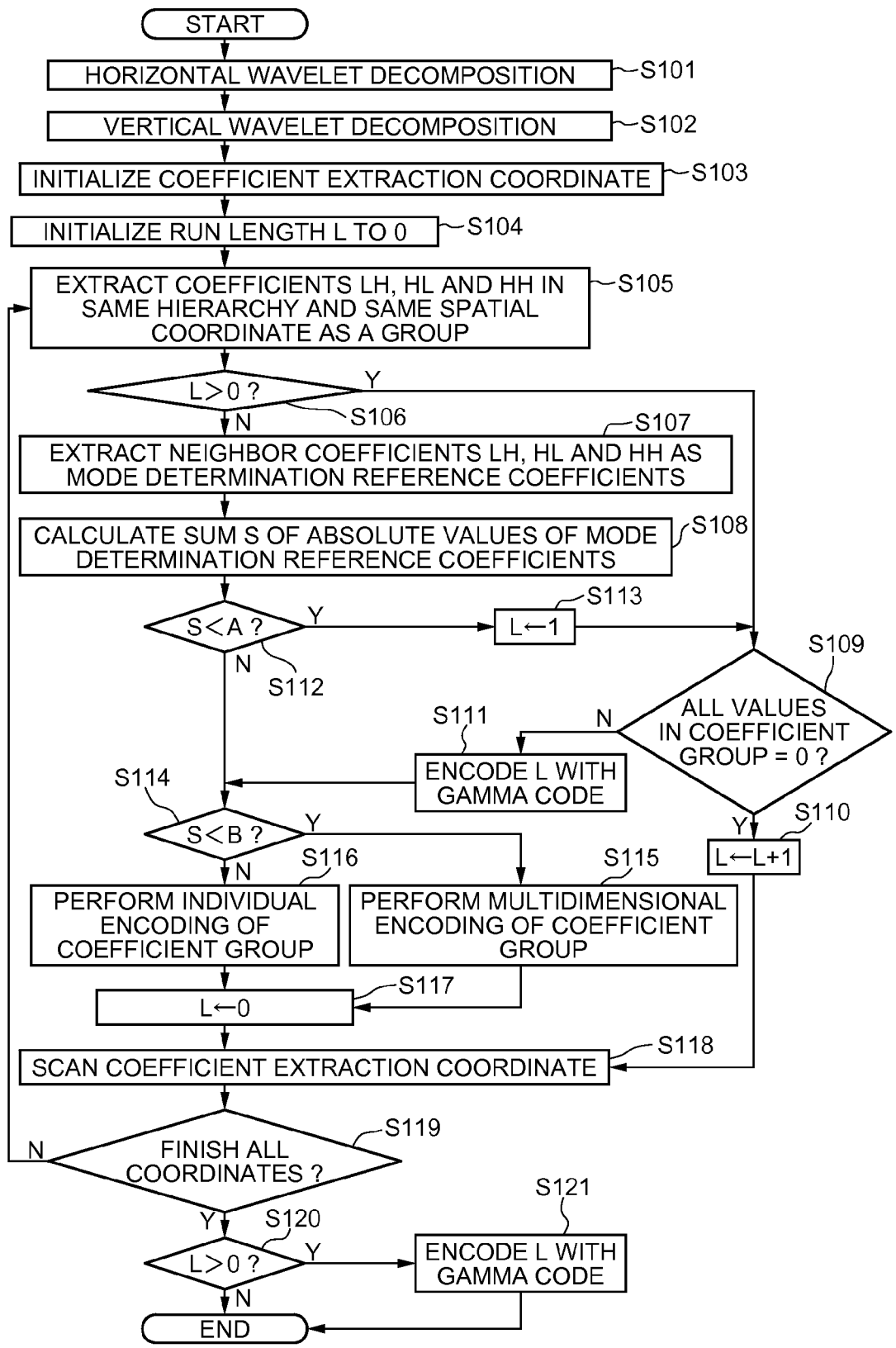
FIG. 6 is a flowchart showing an operation of the wavelet transform encoding apparatus in accordance with the first exemplary embodiment of the present invention.

An overall behavior of this exemplary embodiment will be described in detail with reference to the block diagram of FIG. 1 and the flowchart of FIG. 6.

Once an image is inputted from the image input device 11 to the image memory 121, the horizontal wavelet decomposition unit 1311 carries out horizontal wavelet decomposition for the input image, and stores the acquired horizontal decomposition coefficients L and H in the horizontal decomposition coefficient memory 122 (S101). Subsequently, the vertical wavelet decomposition unit 1312 carries out vertical wavelet decomposition for the horizontal decomposition coefficients stored in the horizontal decomposition coefficient memory 122, and stores the acquired wavelet transform coefficients LL, LH, HL and HH in the horizontal and vertical decomposition coefficient memory 123 (S102).

Next, the coefficient encoding unit 132 initializes a coefficient extraction coordinate to (0, 0) (S103). Further, the coefficient encoding unit 132 initializes a run length L stored in the run length memory 124 to 0 (S104).

Next, the coefficient group extracting unit 1325 extracts the coefficients LH, HL and HH located in the coefficient extraction coordinate in the same wavelet hierarchy (S105).

Next, the run length mode determining unit 1322 retrieves the value of L stored in the run length memory 124 and determines whether or not the value is more than 0 (S106). If more than 0 (Y at step S106), the run length mode determining unit 1322 determines that the run length mode is entered at present, and the process proceeds to step S109. If not more than 0 (N at step S106), the process proceeds to step S107.

At step S107, the mode determination reference coefficient extracting unit 1321 extracts wavelet transform coefficients to be referred to for discrimination of an encoding mode. Next, the run length mode determining unit 1322 obtains the sum S of the absolute values of the reference coefficients extracted by the mode determination reference coefficient extracting unit 1321 (S108). Next, the run length mode determining unit 1322 determines whether or not S is less than A (S112). In a case where S is less than A (Y at step S112), the run length mode is entered, and the process proceeds to step S113. If not (N at step S112), the process proceeds to step S114.

At step S113, the run length encoding unit 1323 writes 1 as an initial value into the run length L stored in the run length memory 124, and the process proceeds to step S109. At step S109, the run length encoding unit 1323 determines whether or not all the coefficients of the coefficient group extracted by the coefficient group extracting unit 1325 are 0. In a case where all are 0 (Y at step S109), the run length encoding unit 1323 increments the run length L stored in the run length memory 123 (5110). Then, the process proceeds to step S118. On the other hand, in a case where any of the wavelet transform coefficients LH, HL and HH is non-zero (N at step S109), the run length encoding unit 1323 encodes the run length L stored in the run length memory 124 with Gamma code, and outputs the result to the code output device 14 (S111). After that, the run length mode is exited and the process proceeds to step S114. In the case of following the path of steps S106→S109→S111 toward step S114, the same processes as those of steps S107 and S108 are executed, and then, the process shifts to step S114.

At step S114, the multidimensional encoding mode determining unit 1324 compares the sum S of the absolute values of the reference coefficients extracted by the mode determination reference coefficient extracting unit 1321 with a threshold B which is set to a larger value than A. In a case where S is less than B (Y at step S114), the process proceeds to step S115, and the multidimensional coefficient encoding unit 1326 performs a multidimensional encoding process. If not (N at step S114), the process proceeds to step S116, and an individual encoding process by the individual coefficient encoding unit 1328 is performed. For either of the processes, the result of the encoding process is outputted to the code output device 14, and the process proceeds to step S117.

When the multidimensional variable-length encoding process or the individual encoding process ends, the coefficient encoding unit 132 clears the run length L in the run length memory 124 to 0 (S117). Next, the coefficient encoding unit 132 scans the coefficient extraction coordinate to the next in a raster scanning order (S118), and determines whether or not the encoding process is finished for all the groups of the wavelet transform coefficients LH, HL and HH of the high-frequency subbands (S119). If not (N at step S119), the process moves back to the step S105 to repeat the same process as described hereinabove for the next group of the wavelet transform coefficients LH, HL and HH located spatially in the same coordinate of the respective high-frequency subbands. If the encoding process is finished for all the groups of the wavelet transform coefficients LH, HL and HH (Y at step S119), the process proceeds to step S120.

When the process on all the spatial coordinates is finished and the process proceeds to step S120, the run length encoding unit 1323 determines whether or not the run length L stored in the run length memory 124 is more than 0. If not (N at step S120), the run length encoding unit 1323 ends the process. If more than 0 (Y at step S120), the run length encoding unit 1323 encodes the run length L in the run length memory 124 by Gamma encoding, outputs the result to the code output device 14 (step S121), and ends the processing.

Figure 7:
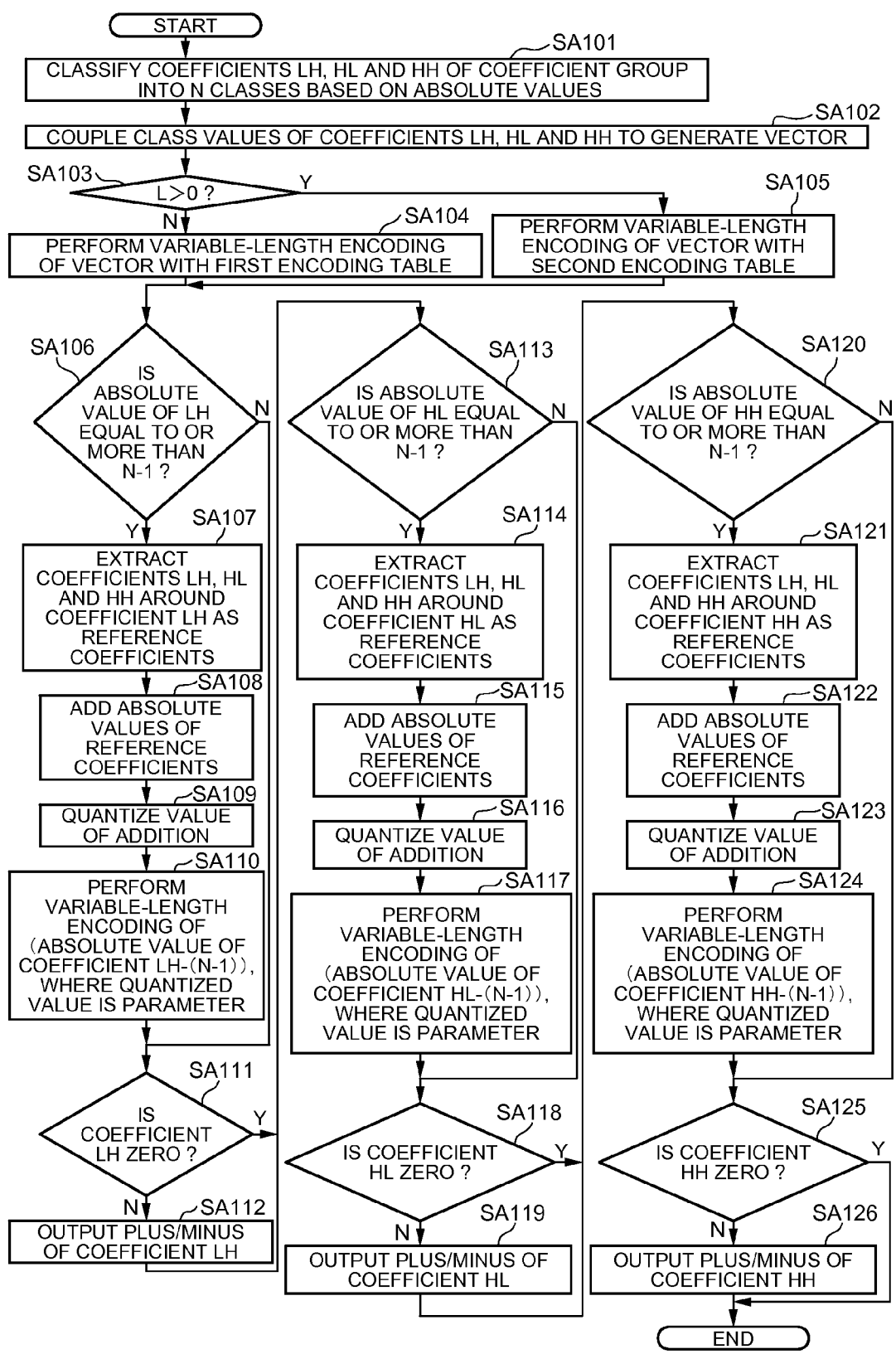
FIG. 7 is a flowchart showing an example of a multidimensional coefficient encoding process in the wavelet transform encoding apparatus in accordance with the first exemplary embodiment of the present invention.

Next, referring to the block diagram of FIG. 1 and the flowchart of FIG. 7, a behavior of the multidimensional variable-length encoding process (S115 in FIG. 6) in this exemplary embodiment will be described in detail.

The multidimensional coefficient vector encoding unit 13261 classifies the absolute values of the coefficients LH, HL and HH of the coefficient group extracted by the coefficient group extracting unit 1325 into N classes in total (N≥3) including 0, 1, . . . , and N−1 or more (SA101). Further, the multidimensional coefficient vector encoding unit 13261 couples the class numbers of LH, HL and HH and generates a three-dimensional vector (SA102).

Next, the code table switching unit 132611 determines whether or not encoding is to be performed immediately after the run length mode is exited, based on whether or not the run length L stored in the run length memory 124 is more than 0 (SA103). In a case where L is not more than 0 (N at step SA103), it is immediately after the run length mode is exited, and therefore, the multidimensional coefficient vector encoding unit 13261 encodes the three-dimensional vector by using a first encoding table (SA104). In a case where L is more than 0 (Y at step SA103), it is immediately after the run length mod is exited, and therefore, the multidimensional coefficient vector encoding unit 13261 encodes the three-dimensional vector by using a second encoding table and outputs the result to the code output device 14 (SA105).

Next, the multidimensional coefficient amplitude encoding unit 13263 determines whether or not the absolute value of LH is equal to or more than N−1 (SA106). In a case where the value is not equal to or more than N−1 (N at step SA106), the process proceeds to step SA111. In a case where the value is equal to or more than N−1 (Y at step SA106), the process proceeds to step SA107.

At step SA107, the reference coefficient extracting unit 1327 extracts reference coefficients for the coefficient LH. Next, the encoding parameter calculating unit 132631 adds the absolute values of the reference coefficients to obtain the sum thereof (SA108), and quantizes the obtained sum to calculate an encoding parameter k (SA109). Next, by using the encoding parameter k calculated by the encoding parameter calculating unit 132631, the multidimensional coefficient amplitude encoding unit 13263 performs Golomb-Rice coding on a value obtained by subtracting N−1 from the absolute value of the coefficient LH, and outputs the result to the code output device 14 (SA110). Then, the process proceeds to step SA111.

At step SA111, the multidimensional coefficient plus/minus encoding unit 13262 determines whether or not the LH coefficient is zero. If not zero (N at step SA111), the multidimensional coefficient plus/minus encoding unit 13262 outputs the plus/minus sign of the coefficient LH to the code output device 14 (SA112), and the process proceeds to step SA113. If zero (Y at step SA111), the process skips step SA112 and proceeds to step SA113.

Next, at step SA113, the multidimensional coefficient amplitude encoding unit 13263 determines whether or not the absolute value of HL is equal to or more than N−1. In a case where the value is not equal to or more than N−1 (N at step SA113), the process proceeds to step SA118. In a case where the value is equal to or more than N−1 (Y at step SA113), the process proceeds to step SA114.

At step SA114, the reference coefficient extracting unit 1327 extracts reference coefficients for the coefficient HL. Next, the encoding parameter calculating unit 132631 adds the absolute values of the reference coefficients to obtain the sum thereof (SA115), and quantizes the obtained sum to calculate an encoding parameter k (SA116). Next, by using the encoding parameter k calculated by the encoding parameter calculating unit 132631, the multidimensional coefficient amplitude encoding unit 13263 performs Golomb-Rice coding on a value obtained by subtracting N−1 from the absolute value of the coefficient HL, and outputs the result to the code output device 14 (step SA117). Then, the process proceeds to step SA118.

At step SA118, the multidimensional coefficient plus/minus encoding unit 13262 determines whether or not the coefficient HL is zero. If not zero (N at step SA118), the multidimensional coefficient plus/minus encoding unit 13262 outputs the plus/minus sign of the coefficient HL to the code output device 14 (SA119), and the process proceeds to step SA120. If zero (Y at step SA118), the process skips step SA119 and proceeds to step SA119.

Next, at step SA120, the multidimensional coefficient amplitude encoding unit 13263 determines whether or not the absolute value of HH is equal to or more than N−1. In a case where the value is not equal to or more than N−1 (N at step SA120), the process proceeds to step SA125. In a case where the value is equal to or more than N−1 (Y at step SA120), the process proceeds to step SA121.

At step SA121, the reference coefficient extracting unit 1327 extracts reference coefficients for the coefficient HH. Next, the encoding parameter calculating unit 132631 adds the absolute values of the reference coefficients to obtain the sum thereof (SA122), and quantizes the obtained sum to calculate an encoding parameter k (SA123). Next, by using the encoding parameter k calculated by the encoding parameter calculating unit 132631, the multidimensional coefficient amplitude encoding unit 13263 performs Golomb-Rice coding on a value obtained by subtracting N−1 from the absolute value of the coefficient HH, and outputs the result to the code output device 14 (SA124). Then, the process proceeds to step SA125.

At step SA125, the multidimensional coefficient plus/minus encoding unit 13262 determines whether or not the HH coefficient is zero. In a case where the coefficient is not zero (N at step SA125), the multidimensional coefficient plus/minus encoding unit 13262 outputs the plus/minus sign of the HL coefficient to the code output device 14 (SA126), and the multidimensional variable-length encoding process is ended. In a case where the coefficient is zero (Y at step SA125), step SA126 is skipped and the multidimensional variable-length encoding process is ended.

Figure 8:
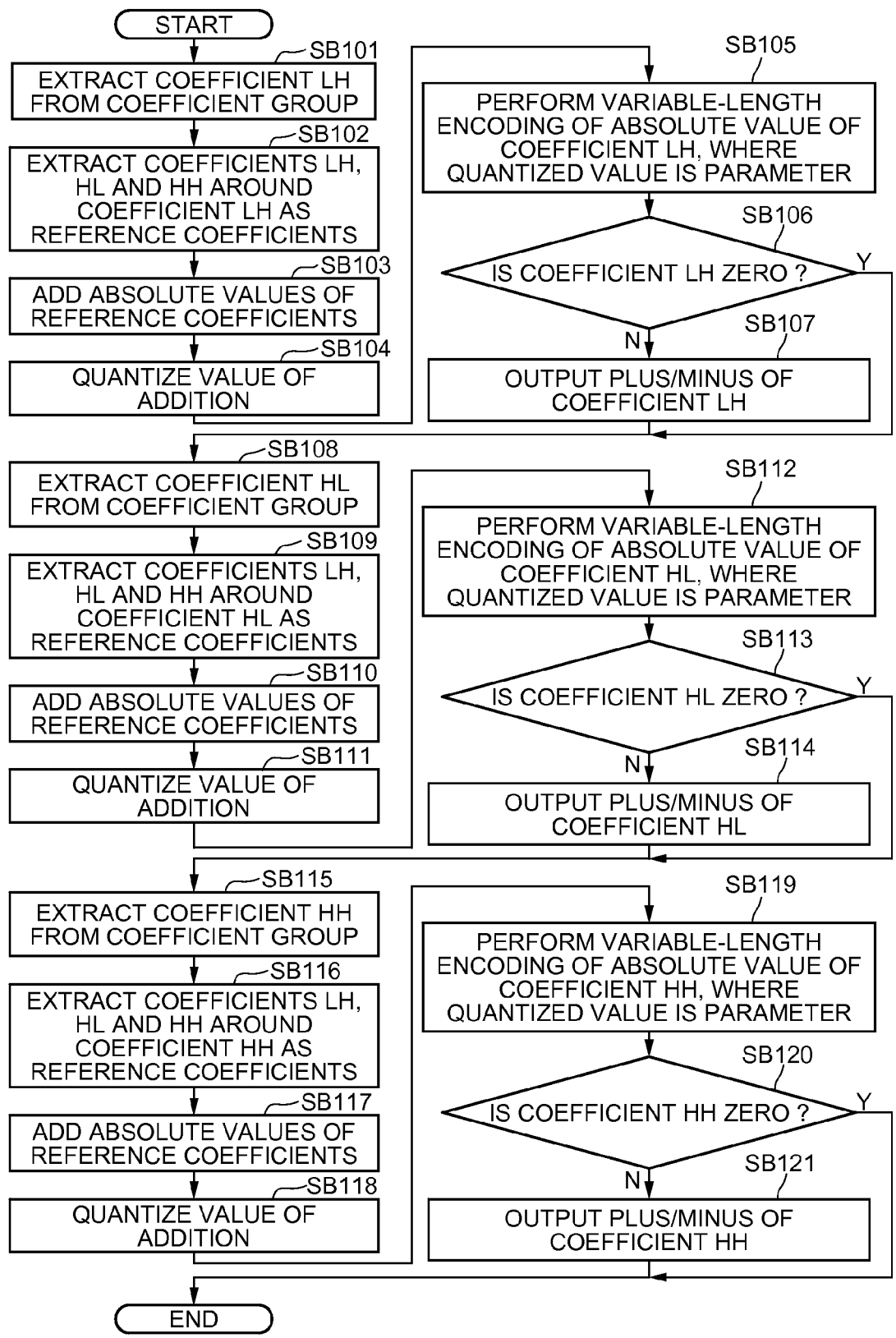
FIG. 8 is a flowchart showing an example of an individual coefficient encoding process in the wavelet transform encoding apparatus in accordance with the first exemplary embodiment of the present invention.

Next, referring to the block diagram of FIG. 1 and the flowchart of FIG. 8, a behavior of the individual coefficient encoding process (S116 in FIG. 6) of this exemplary embodiment will be described in detail.

The target coefficient extracting unit 13281 extracts the coefficient LH from the coefficient group extracted by the coefficient group extracting unit 1325 (SB101). Next, the reference coefficient extracting unit 1327 extracts the reference coefficients for the coefficient LH (SB102). Next, the encoding parameter calculating unit 132821 adds the absolute values of the reference coefficients to obtain the sum (SB103), and quantizes the obtained sum to calculate an encoding parameter k (SB104). Next, the coefficient amplitude encoding unit 13282 performs Golomb-Rice coding on the absolute value of the coefficient LH by using the encoding parameter k calculated by the encoding parameter calculating unit 132821, and outputs the result to the code output device 14 (SB105).

Next, the coefficient plus/minus encoding unit 13283 determines whether or not the coefficient LH is zero (SB106). If not zero (N at step SB106), the coefficient plus/minus encoding unit 13283 outputs the plus/minus sign of the coefficient LH to the code output device 14 (SB107), and the process proceeds to step SB108. If zero (Y at step SB106), the process skips step SB107 and proceeds to step SB108.

At step SB108, the target coefficient extracting unit 13281 extracts the coefficient HL from the coefficient group extracted by the coefficient group extracting unit 1325. Next, the reference coefficient extracting unit 1327 extracts the reference coefficients for the coefficient HL (SB109). Next, the encoding parameter calculating unit 132821 adds the absolute values of the reference coefficients to obtain the sum (SB110), and quantizes the obtained sum to calculate an encoding parameter k (SB111). Next, the coefficient amplitude encoding unit 13282 performs Golomb-Rice coding on the absolute value of the coefficient HL by using the encoding parameter k calculated by the encoding parameter calculating unit 132821, and outputs the result to the code output device 14 (SB112).

Next, the coefficient plus/minus encoding unit 13283 determines whether or not the coefficient HL is zero (SB113). If not zero (N at step SB113), the coefficient plus/minus encoding unit 13283 outputs the plus/minus sign of the coefficient HL to the code output device 14 (SB114), and the process proceeds to step SB115. If zero (Y at step SB113), the process skips step SB114 and proceeds to step SB115.

At step SB115, the target coefficient extracting unit 13281 extracts the coefficient HH from the coefficient group extracted by the coefficient group extracting unit 1325. Next, the reference coefficient extracting unit 1327 extracts the reference coefficients for the coefficient HH (SB126). Next, the encoding parameter calculating unit 132821 adds the absolute values of the reference coefficients to obtain the sum (SB117), and quantizes the obtained sum to calculate an encoding parameter k (SB118).

Next, the coefficient amplitude encoding unit 13282 performs Golomb-Rice coding on the absolute value of the coefficient HH by using the encoding parameter k calculated by the encoding parameter calculating unit 132821, and outputs the result to the code output device 14 (SB119). Next, the coefficient plus/minus encoding unit 13283 determines whether or not the coefficient HH is zero (SB113). If not zero (N at step SB120), the coefficient plus/minus encoding unit 13283 outputs the plus/minus sign of the coefficient HH to the code output device 14 (SB121), and the individual coefficient encoding process is ended. If zero (Y at step SB120), the process skips step SB121, and the individual coefficient encoding process is ended.

Next, effects of this exemplary embodiment will be described.

According to this exemplary embodiment, it is possible to perform encoding with high compression ratio on various two-dimensional signals such as a two-dimensional signal for which it is desirable to collectively encode a plurality of wavelet transform coefficients located spatially at the same position, a two-dimensional signal for which it is desirable to individually encode, and a two-dimensional signal containing both a portion for which it is desirable to collectively encode and a portion for which it is desirable to individually encode. This is because, for each group of a plurality of wavelet transform coefficients located spatially at the same position, it is determined whether to collectively encode or individually encode the plurality of wavelet transform coefficients based on the sum of the absolute values of a plurality of wavelet transform coefficients located spatially in the vicinity of the encoding target coefficient group, and therefore, correlated with the encoding target coefficient group.

Further, according to this exemplary embodiment, when S is less than the threshold A, it is expected that the noted coefficient group is likely to take all zero values, and the run length mode is entered. In the multidimensional variable-length encoding mode, a code of 1 bit or more is outputted for each coefficient group. However, in the run length mode, it is possible to collectively encode a plurality of coefficient groups each taking all zero values, and therefore, it is possible to make a code size for each group less than 1 bit. Consequently, it is possible to further achieve increase of compression ratio. Moreover, once the run length mode is entered, as far as coefficient groups each taking all zero values continue, it is unnecessary to refer to the peripheral coefficients LH, HL and HH at the time of processing the coefficient groups. Consequently, it is possible to achieve a higher-speed encoding/decoding process.

Further, in this exemplary embodiment, two variable-length code tables for vector are provided, and variable-length code tables to be used are switched depending on whether or not it is immediately after the run length mode is exited. Immediately after the run length mode is exited, which is a state where run length determination has been performed once and run length has not been established, all the coefficients LH, HL and HH do not become zero. Under such a condition, by switching to a variable-length code table which does not assign a variable-length code to a vector with all the coefficient values zero, it is possible to make an average code length short, and compression efficiency increases.

Further, it is assumed that the value of N is three or more in the above description, but a required variable-length code table becomes larger in size as N becomes larger. For most images, N−3 is effective in the aspect of the size of a variable-length code table and the compression ratio. Moreover, for most images, the most favorable compression ratio can be achieved when the threshold A is set to 3 and the threshold B is set to 6.

The run length mode produces an effect only under a condition that a case where all the coefficients LH, HL and HH are zero often occurs. Therefore, when a low compression ratio is pointed to and quantization is not performed on coefficients so much, that is, when it is supposed that a probability of entering the run length mode is low, the process in the run length mode may be omitted.

[Second Exemplary Embodiment]

Next, a second exemplary embodiment of the present invention will be described referring to the accompanying drawings.

Figure 9:
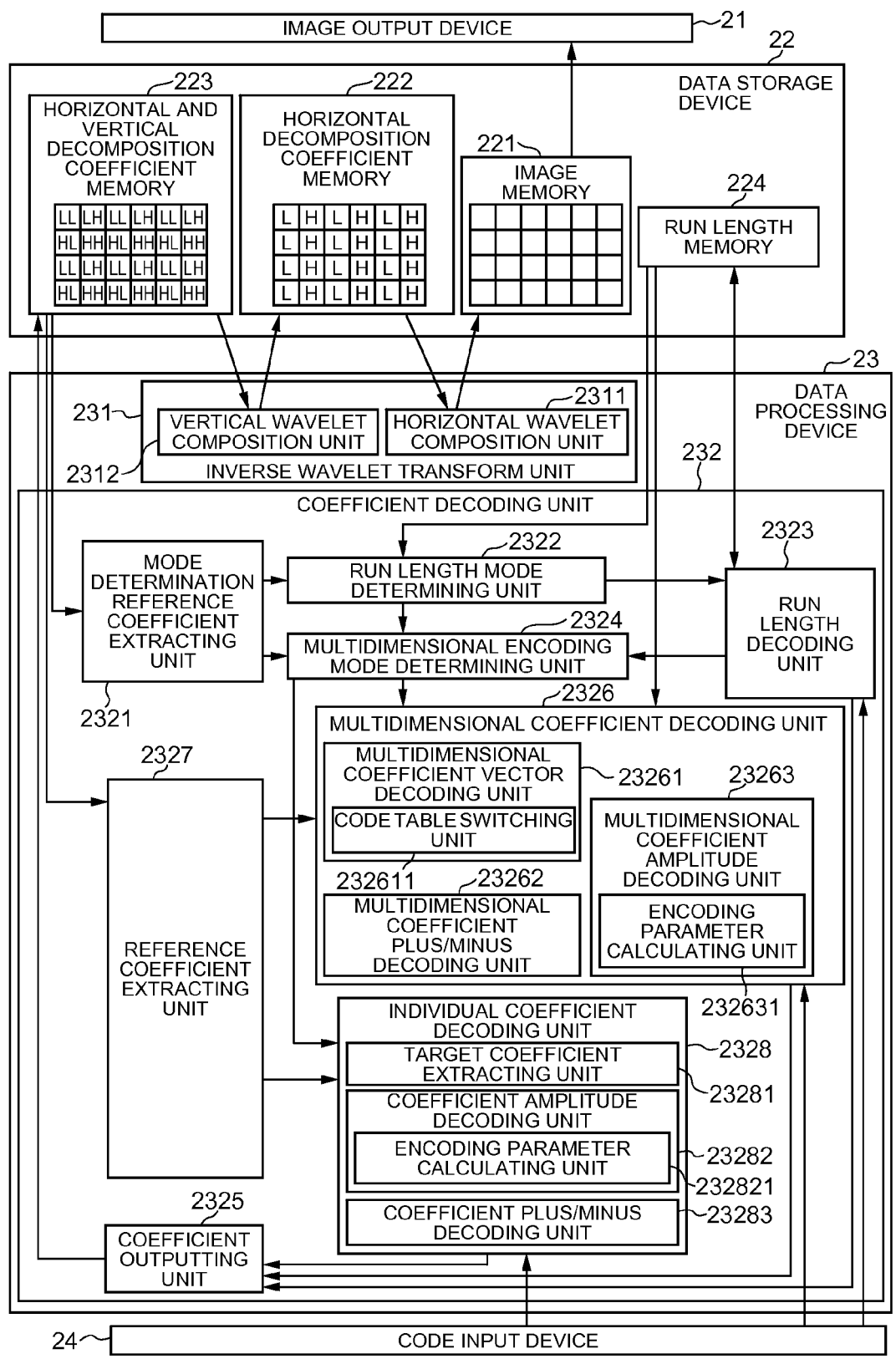
FIG. 9 is a block diagram of a wavelet transform decoding apparatus in accordance with a second exemplary embodiment of the present invention.

This exemplary embodiment corresponds to a device which decodes the data encoded in the first exemplary embodiment. Referring to FIG. 9, the second exemplary embodiment of the present invention is comprised of an image output device 21, a data storage device 22, a data processing device 23 operating by program control, and a code input device 24.

{Explanation of Configuration}

The code input device 24 is a device which inputs a code of the decoding target. For example, the code input device 24 is configured by a magnetic disk device, a communication device, and so on.

The data storage device 22 includes an image memory 221, a horizontal decomposition coefficient memory 222, a horizontal and vertical decomposition coefficient memory 223, and a run length memory 224.

The horizontal and vertical decomposition coefficient memory 223 stores wavelet transform coefficients LH, HL and HH of high-frequency subbands decoded by the data processing device 23, and a wavelet transform coefficient LL of the lowest-frequency subband.

The horizontal decomposition coefficient memory 222 stores horizontal decomposition coefficients decoded by the data processing device 23.

The image memory 221 stores an image decoded by the data processing device 23.

The data processing device 23 is comprised of an inverse wavelet transform unit 231, and a coefficient decoding unit 232.

The coefficient decoding unit 232 decodes wavelet transform coefficients from a code string inputted from the code input device 24 for each group of a plurality of wavelet transform coefficients located spatially at the same position within a plurality of high-frequency subbands belonging to the same hierarchy, and stores the result into the horizontal and vertical decomposition coefficient memory 223.

The coefficient decoding unit 232 is comprised of a mode determination reference coefficient extracting unit 2321, a run length mode determining unit 2322, a run length decoding unit 2323, a multidimensional encoding mode determining unit 2324, a coefficient outputting unit 2325, a multidimensional coefficient decoding unit 2326, a reference coefficient extracting unit 2327, and an individual coefficient decoding unit 2328. The run length mode determining unit 2322 and the multidimensional encoding mode determining unit 2324 configure a decoding method determining unit.

The mode determination reference coefficient extracting unit 2321 extracts wavelet transform coefficients to be referred to for discriminating a decoding mode. The wavelet transform coefficients to be referred to are the same as those in encoding. To be specific, when a group of the wavelet transform coefficients LH, HL and HH to be decoded next is a part enclosed by a thick solid line in FIG. 2, the mode determination reference coefficient extracting unit 2321 extracts the following six wavelet transform coefficients in total hatched in FIG. 2 as reference coefficients:

(1) the wavelet transform coefficient LH of the coordinate value (i, j−1);

(2) the wavelet transform coefficient HL of the coordinate value (i, j−1);

(3) the wavelet transform coefficient HH of the coordinate value (i, j−1);

(4) the wavelet transform coefficient LH of the coordinate value (i−1, j);

(5) the wavelet transform coefficient HL of the coordinate value (i−1, j); and (6) the wavelet transform coefficient HH of the coordinate value (i−1, j).

Herein, it is assumed that the coordinate value of the decoding target coefficient group enclosed by the thick solid line is (i, j). However, for a wavelet transform coefficient of no equivalent coordinate value, a predetermined value (e.g., 0) is used.

The run length mode determining unit 2322 determines whether or not a run length mode is entered at present. In a case where the run length mode is entered, a run length decoding process by the run length decoding unit 2323 is performed. In a case where the run length mode is not entered, the run length mode determining unit 2322 obtains a sum S of the absolute values of the reference coefficients extracted by the mode determination reference coefficient extracting unit 2321, and compares the sum S with a predetermined threshold A. In a case where S is less than A, the run length mode is entered, and the run length decoding process by the run length decoding unit 2323 is performed. On the other hand, in a case where S is not less than A, mode determination by the multidimensional encoding mode determining unit 2324 is performed.

The run length decoding unit 2323 retrieves code data of Gamma code from the code input device 24 to decode the run length L, and outputs the result to the run length memory 224. Further, when the run length L stored in the run length memory 224 is larger than 1, the run length decoding unit 2323 decrements the run length L and writes the result back to the run length memory 224, and sets all the values of the coefficients LH, HL and HH of the decoding target coefficient group to 0. When the run length L becomes 1 or less, the run length decoding unit 2323 initializes the run length memory 224 to zero, and the run length mode is exited.

The multidimensional encoding mode determining unit 2324 obtains the sum S of the absolute values of the reference coefficients extracted by the mode determination reference coefficient extracting unit 2321, and compares the result with the threshold B that is set to a larger value than A. In a case where S is less than B, a multidimensional variable-length decoding process by the multidimensional coefficient decoding unit 2326 is performed. On the other hand, in a case where S is not less than B, an individual coefficient decoding process by the individual coefficient decoding unit 2328 is performed.

The reference coefficient extracting unit 2327 extracts reference coefficients for obtaining an encoding parameter to be used at the time of decoding the coefficients LH, HL and HH one by one by the multidimensional coefficient decoding unit 2326 and the individual coefficient decoding unit 2328. The coefficients hatched in FIGS. 3 to 5 represent the reference coefficients extracted by the reference coefficient extracting unit 2327 at the time of decoding the coefficients LH, HL and HH enclosed by thick lines in FIGS. 3 to 5. The reference coefficient extracting unit 2327 extracts the reference coefficients from subbands to which a decoding target wavelet transform coefficient belongs, and also extracts from other subbands in the same coefficient. The wavelet transform coefficients to be referred to are the same as those in encoding.

To be specific, assuming (i, j) is the coordinate value of the decoding target wavelet transform coefficient LH, in decoding of the coefficient LH, the following four wavelet transform coefficients shown in FIG. 3 are referred to:

(1) the wavelet transform coefficient LH of the coordinate value (i, j−1);
(2) the wavelet transform coefficient HL of the coordinate value (i, j−1);
(3) the wavelet transform coefficient HH of the coordinate value (i, j−1); and
(4) the wavelet transform coefficient LH of the coordinate value (i−1, j).

However, a predetermined value (zero, for example) is utilized for wavelet transform coefficients of no corresponding coordinate values.

Further, assuming (i, j) is the coordinate value of the decoding target wavelet transform coefficient HL, in decoding of the coefficient HL, the following four wavelet transform coefficients shown in FIG. 4 are referred to:

(1) the wavelet transform coefficient HL of the coordinate value (i, j−1);
(2) the wavelet transform coefficient HL of the coordinate value (i−1, j);
(3) the wavelet transform coefficient HH of the coordinate value (i−1, j); and
(4) the wavelet transform coefficient LH of the coordinate value (i, j).

However, a predetermined value (zero, for example) is utilized for wavelet transform coefficients of no corresponding coordinate values.

Further, assuming (i, j) is the coordinate value of the decoding target wavelet transform coefficient HH, in decoding of the coefficient HH, the following four wavelet transform coefficients shown in FIG. 5 are referred to:

(1) the wavelet transform coefficient HH of the coordinate value (i, j−1);
(2) the wavelet transform coefficient HH of the coordinate value (i−1, j);
(3) the wavelet transform coefficient LH of the coordinate value (i, j); and
(4) the wavelet transform coefficient HL of the coordinate value (i, j).

However, a predetermined value (zero, for example) is utilized for wavelet transform coefficients of no corresponding coordinate values.

The multidimensional coefficient decoding unit 2326 collectively decodes a plurality of wavelet transform coefficients included in a decoding target coefficient group (carries out multidimensional variable-length decoding). The multidimensional coefficient decoding unit 2326 is comprised of a multidimensional coefficient vector decoding unit 23261, a multidimensional coefficient plus/minus decoding unit 23262, and a multidimensional coefficient amplitude decoding unit 23263. Moreover, the multidimensional coefficient vector decoding unit 23261 is comprised of a code table switching unit 232611, and the multidimensional coefficient amplitude decoding unit 23263 is comprised of an encoding parameter calculating unit 232631.

The multidimensional coefficient vector decoding unit 23261, with respect to a coefficient group of the decoding target, classifies the absolute values of the coefficients LH, HL and HH into N classes in total (N≥3) including 0, 1, . . . , and N−1 or more, and carries out variable-length decoding on a three-dimensional vector composed of class numbers of LH, HL and HH by using a variable-length code table. The N classes include (N−1) classes that the absolute values are 0, 1, . . . , and (N−2) and a difference of the absolute values between the adjacent classes is 1, and a class that the absolute value is N−1 or more.

The code table switching unit 232611 changes a variable-length code table to be referred to by the multidimensional coefficient vector decoding unit 23261 based on whether or not decoding is to be performed immediately after the run length mode is exited.

After decoding by the multidimensional coefficient vector decoding unit 23261, with respect to a coefficient whose absolute value is non-zero, the multidimensional coefficient plus/minus decoding unit 23262 decodes a plus/minus sign from a code inputted from the code input device 24.

After decoding by the multidimensional coefficient vector decoding unit 23261, for a coefficient value that an absolute value is N−1 or more, the multidimensional coefficient amplitude decoding unit 23263 performs Golomb-Rice decoding of the code inputted from the code input device 14 into a value which is the result of subtracting N−1 from the absolute value. In decoding of a plurality of wavelet transform coefficients that the absolute values are N−1 or more, the multidimensional coefficient amplitude decoding unit 23263 decodes in order of LH, HL and HH in a coefficient group. Moreover, the multidimensional coefficient amplitude decoding unit 23263 adds N−1 to the decoded value.

With respect to a coefficient to be subjected to Golomb-Rice decoding by the multidimensional coefficient amplitude decoding unit 23263, the encoding parameter calculating unit 232631 acquires reference coefficients from the reference coefficient extracting unit 2327 and calculates an encoding parameter k. To be specific, the encoding parameter calculating unit 232631 divides the sum of the absolute values of the reference coefficients by a predetermined value or quantizes the sum by an operation such as right shift, thereby calculating an encoding parameter k.

The individual coefficient decoding unit 2328 individually decodes the coefficients LH, HL and HH of a coefficient group of the decoding target. The individual coefficient decoding unit 2328 is comprised of a target coefficient extracting unit 23281, a coefficient amplitude decoding unit 23282, and a coefficient plus/minus decoding unit 23283. Moreover, the coefficient amplitude decoding unit 23282 has an encoding parameter calculating unit 232821.

The target coefficient extracting unit 23281 selects the coefficients of the decoding targets from a coefficient group in the same order as in encoding. For example, in decoding of the coefficient group enclosed by the thick line in FIG. 2 as a decoding target, the target coefficient extracting unit 23281 firstly selects LH from the group as a coefficient to be decoded, next selects HL, and finally selects HH.

With respect to the coefficients LH, HL and HH to be subjected to Golomb-Rice decoding by the coefficient amplitude decoding unit 23282, the encoding parameter calculating unit 232821 acquires reference coefficients from the reference coefficient extracting unit 2327, and calculates an encoding parameter k. A method for calculating an encoding parameter k by the encoding parameter calculating unit 232821 is the same as the method by the encoding parameter calculating unit 232631.

By using the encoding parameter k calculated by the encoding parameter calculating unit 232821, the coefficient amplitude decoding unit 23282 performs Golomb-Rice decoding of the code inputted from the code input device 14 into the absolute value of the coefficient selected by the target coefficient extracting unit 23281.

When the coefficient decoded by the coefficient amplitude decoding unit 23282 is non-zero, the coefficient plus/minus decoding unit 23283 decodes a plus/minus sign thereof from the code inputted from the code input device 24.

The coefficient outputting unit 2325 outputs the values of the coefficients decoded by the coefficient decoding unit 232 (i.e., the values of the coefficients decoded by the run length decoding unit 2323, the multidimensional coefficient decoding unit 2326, and the individual coefficient decoding unit 2328) to the horizontal and vertical decomposition coefficient memory 223.

A decoding unit for generating the wavelet transform coefficient LL of the lowest-frequency subband from a code inputted from the code input device 24 is not shown in the accompanying drawings. The wavelet transform coefficient LL of the lowest-frequency subband is also stored into the horizontal and vertical decomposition coefficient memory 223.

The inverse wavelet transform unit 231 is comprised of a horizontal wavelet composition unit 2311, and a vertical wavelet composition unit 2312.

The vertical wavelet composition unit 2312 retrieves the wavelet transform coefficients LL, LH, HL and HH stored in the horizontal and vertical decomposition coefficient memory 223 line by line in the vertical direction, performs vertical wavelet composition thereon, and stores the obtained coefficients L and H into the horizontal decomposition coefficient memory 222.

The horizontal wavelet composition unit 2311 retrieves the horizontal decomposition coefficients L and H stored in the horizontal decomposition coefficient memory 222 line by line in the horizontal direction, performs horizontal wavelet composition thereon, and stores the obtained pixel data into the image memory 221.

The image output device 21 is configured by, for example, a display device. The image output device 21 retrieves and outputs the pixel data stored in the image memory 221.

{Explanation of Behavior}

Figure 10:
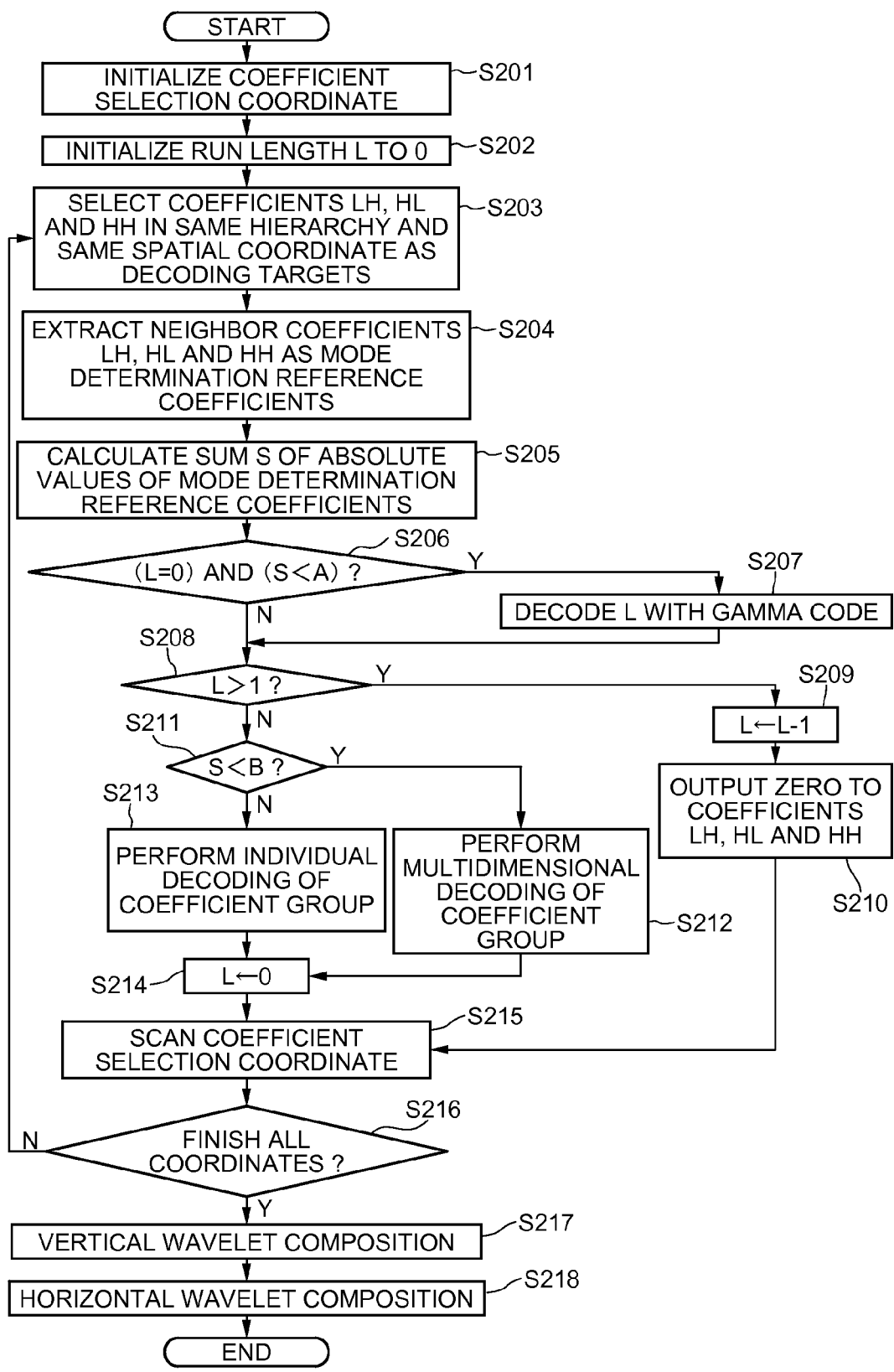
FIG. 10 is a flowchart showing an operation of the wavelet transform decoding apparatus in accordance with the second exemplary embodiment of the present invention.

An overall behavior of this exemplary embodiment will be described in detail with reference to the block diagram of FIG. 9 and the flowchart of FIG. 10.

Firstly, the coefficient decoding unit 232 initializes the selection coordinate of a decoding target coefficient group to (0, 0) (S201). Further, the coefficient decoding unit 232 initializes the run length L in the run length memory 224 to 0 (S202).

Next, the coefficient decoding unit 232 selects a group of a plurality of wavelet transform coefficients LH, HL and HH located spatially at the same position within a plurality of high-frequency subbands belonging to the same hierarchy, as a coefficient group of the decoding target (S203).

Next, the mode determination reference coefficient extracting unit 2321 extracts wavelet transform coefficients to be referred to for discrimination of an encoding mode (S204).

Next, the run length mode determining unit 2322 calculates the sum S of the absolute values of the mode determination reference coefficients having been extracted above (S205).

Then, the run length mode determining unit 2322 determines whether or not the run length mode is not entered at present (i.e., L=0) and whether or not the sum S of the absolute values of the mode determination reference coefficients is smaller than a predetermined threshold A (S206). In a case where the run length mode is not entered and S is less than A (Y at step S206), the run length decoding unit 2323 retrieves the code data of the Gamma code from the code input device 24, decodes the run length L, enters the run length mode, and outputs the run length L to the run length memory 224 (S207). Then, the process proceeds to step S208. If not (N at step S206), the process skips step S207 and proceeds to step S208.

At step S208, the run length decoding unit 2323 determines whether or not the run length L stored in the run length memory 224 is larger than 1 (S208). In a case where L is larger than 1 (Y at step S208), the run length decoding unit 2323 decrements the run length L and writes the result back to the run length memory 124 (S209), and thereafter, sets all the values of the coefficients LH, HL and HH of the decoding target coefficient group to 0 and outputs 0 to the horizontal and vertical decomposition coefficient memory 223 via the coefficient outputting unit 2325 (S210). Then, the process proceeds to step S215. In a case where the run length L is equal to or less than 1 (N at step S208), the process proceeds to step S211.

At step S211, the multidimensional encoding mode determining unit 2324 compares the sum S of the absolute values of the reference coefficients extracted by the mode determination reference coefficient extracting unit 2321 with a threshold B which is set to a larger value than A. In a case where S is less than B (Y at step S211), a multidimensional decoding process by the multidimensional coefficient decoding unit 2326 is performed (S212). If not (N at step S211), the process proceeds to step S213, and an individual decoding process by the individual coefficient decoding unit 2328 is performed. In either case, the coefficient outputting unit 232 outputs the decoded coefficient value to the horizontal and vertical decomposition coefficient memory 223.

When the multidimensional variable-length decoding process or the individual decoding process ends, the coefficient decoding unit 232 clears the run length L in the run length memory 224 to 0 (S214). Then, the process proceeds to step S215.

At step S215, the coefficient decoding unit 232 scans the coefficient selection coordinate to the next coordinate in a raster scanning order (S215), and determines whether or not decoding of all the groups of the wavelet transform coefficients LH, HL and HH of the high-frequency subbands is finished (S216). If not finished (N at step S216), the process moves back to the step S203 to repeat the same process as described hereinabove for the next group of the wavelet transform coefficients LH, HL and HH located spatially in the same coordinates of the respective high-frequency subbands. If decoding of all the groups of the wavelet transform coefficients LH, HL and HH (Y at step S216), the process proceeds to step S217.

At step S217, the vertical wavelet composition unit 2312 retrieves the wavelet transform coefficients LL, LH, HL and HH stored in the horizontal and vertical decomposition coefficient memory 223 line by line in the vertical direction, performs vertical wavelet composition thereon, and stores the obtained coefficients L and H into the horizontal decomposition coefficient memory 222.

Next, the horizontal wavelet composition unit 2311 retrieves the horizontal decomposition coefficients L and H stored in the horizontal decomposition coefficient memory 222 line by line in the horizontal direction, performs horizontal wavelet composition thereon, and outputs the obtained pixel data to the image memory 221. Consequently, image data to be outputted to the image output device 21 is generated (S218).

Figure 11:
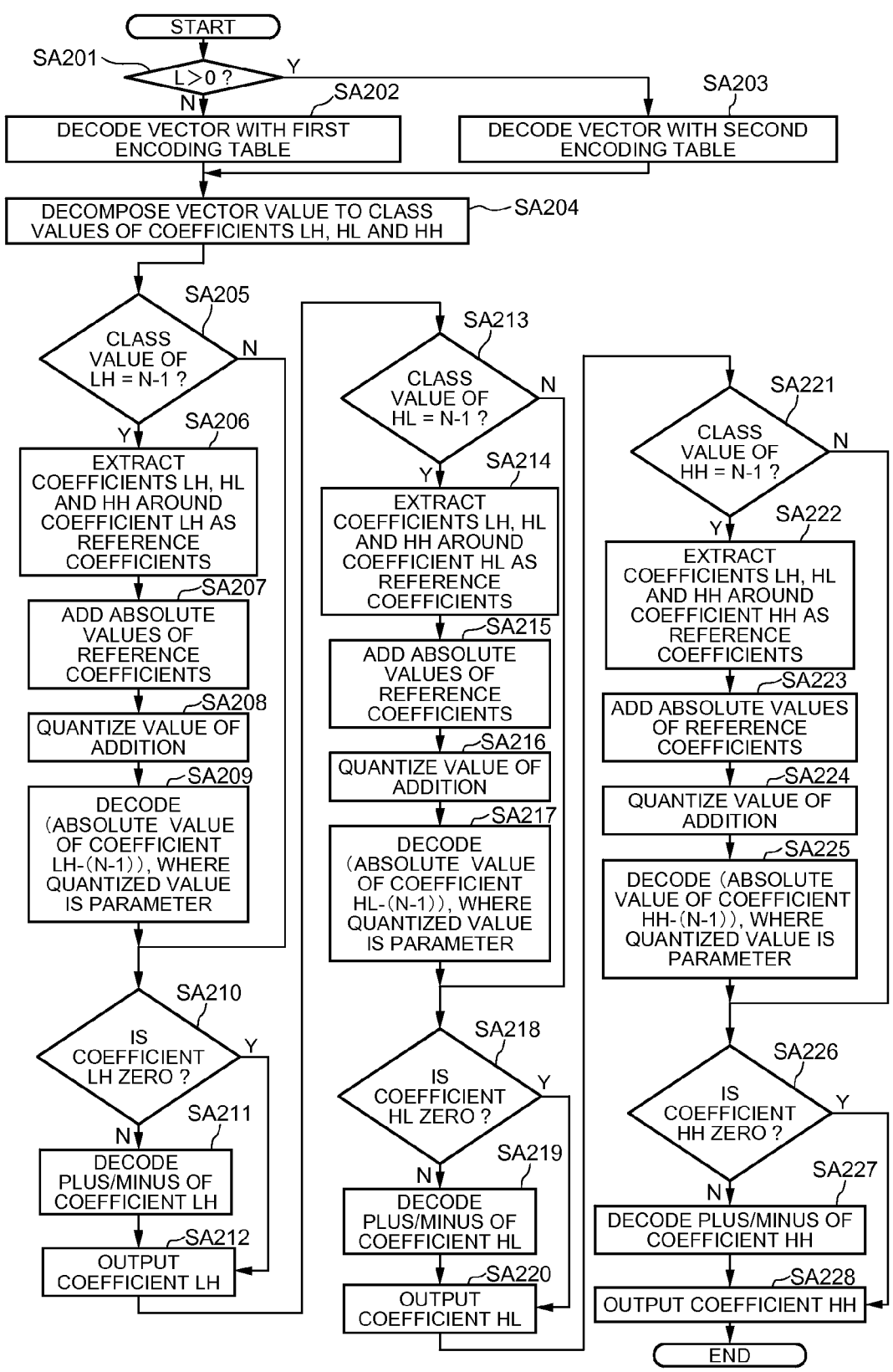
FIG. 11 is a flowchart showing a behavior of multidimensional variable-length decoding in the wavelet transform decoding apparatus in accordance with the second exemplary embodiment of the present invention.

Next, referring to the block diagram of FIG. 9 and the flowchart of FIG. 11, a behavior of the multidimensional variable-length decoding process (step S212 in FIG. 10) in this exemplary embodiment will be described in detail.

First, the code table switching unit 232611 determines whether or not decoding is to be performed immediately after the run length mode is exited, based on whether or not the run length L stored in the run length memory 124 is more than 0 (SA201). In a case where L is not more than 0 (N at step SA201), it is not immediately after the run length mode is exited, and therefore, the multidimensional coefficient vector decoding unit 23261 decodes a three-dimensional vector by using a first encoding table (SA302). In a case where L is more than 0 (Y at step SA201), it is immediately after the run length mode is exited, and therefore, the multidimensional coefficient vector encoding unit 23261 decodes a three-dimensional vector by using a second encoding table (SA203).

The multidimensional coefficient vector decoding unit 23261 decomposes the decoded three-dimensional vector and acquires the class numbers of the absolute values of the coefficients LH, HL and HH (SA204).

Next, the multidimensional coefficient amplitude decoding unit 23263 determines whether or not the class number of LH is N−1 (SA205). If not N−1 (N at step SA205), the multidimensional coefficient amplitude decoding unit 23263 recognizes the class number of LH as the absolute value of LH, and the process proceeds to step SA210. If N−1 (Y at step SA205), the process proceeds to step SA206.

At step SA206, the reference coefficient extracting unit 2327 extracts reference coefficients for the coefficient LH. Next, the encoding parameter calculating unit 232631 adds the absolute values of the reference coefficients to obtain the sum thereof (SA207), and quantizes the obtained sum to calculate an encoding parameter k (SA208). Next, by using the encoding parameter k calculated by the encoding parameter calculating unit 232631, the multidimensional coefficient amplitude decoding unit 23263 performs Golomb-Rice decoding of a code inputted from the code input device 24 into a value which is the result of subtracting N−1 from the absolute value of the coefficient LH (SA209). Further, at this step SA209, the multidimensional coefficient amplitude decoding unit 23263 adds N−1 to the decoded value and obtains the absolute value of the coefficient LH. Then, the process proceeds to step SA210.

At step SA210, the multidimensional coefficient plus/minus decoding unit 23262 determines whether or not the absolute value of the coefficient LH is zero. If not zero (N at step SA210), the multidimensional coefficient plus/minus decoding unit 23262 inputs the plus/minus sign of the coefficient LH from the code input device 24 (SA211), and the process proceeds to step SA212. If zero (Y at step SA210), the process skips step SA211 and proceeds to step SA212.

At step SA212, the coefficient outputting unit 2325 outputs the LH coefficient value decoded by the coefficient decoding unit 232 to the horizontal and vertical decomposition coefficient memory 223.

Next, the multidimensional coefficient amplitude decoding unit 23263 determines whether or not the class number of HL is N−1 (SA213). If not N−1 (N at step SA213), the multidimensional coefficient amplitude decoding unit 23263 recognizes the class number of HL as the absolute value of HL, and the process proceeds to step SA218. If N−1 (Y at step SA213), the process proceeds to step SA214.

At step SA214, the reference coefficient extracting unit 2327 extracts reference coefficients for the coefficient HL. Next, the encoding parameter calculating unit 232631 adds the absolute values of the reference coefficients to obtain the sum thereof (SA215), and quantizes the obtained sum to calculate an encoding parameter k (SA216). Next, by using the encoding parameter k calculated by the encoding parameter calculating unit 232631, the multidimensional coefficient amplitude decoding unit 23263 performs Golomb-Rice decoding of a code inputted from the code input device 24 into a value which is the result of subtracting N−1 from the absolute value of the coefficient LH (SA217). Further, at this step SA217, the multidimensional coefficient amplitude decoding unit 23263 adds N−1 to the decoded value and obtains the absolute value of the coefficient HL. Then, the process proceeds to step SA218.

At step SA218, the multidimensional coefficient plus/minus decoding unit 23262 determines whether or not the absolute value of the coefficient HL is zero. If not zero (N at step SA218), the multidimensional coefficient plus/minus decoding unit 23262 decodes a plus/minus sign of the coefficient HL from the code inputted from the code input device 24 (SA219), and the process proceeds to step SA220. If zero (Y at step SA218), the process skips step SA219 and proceeds to step SA220.

At step SA220, the coefficient group outputting unit 2325 outputs the HL coefficient value decoded by the coefficient decoding unit 232 to the horizontal and vertical decomposition coefficient memory 223.

Next, the multidimensional coefficient amplitude decoding unit 23263 determines whether or not the class number of HH is N−1 (SA221). If not N−1 (N at step SA221), the multidimensional coefficient amplitude decoding unit 23263 recognizes the class number of HH as the absolute value of HH, and the process proceeds to step SA226. If N−1 (Y at step SA221), the process proceeds to step SA222.

At step SA222, the reference coefficient extracting unit 2327 extracts reference coefficients for the coefficient HH. Next, the encoding parameter calculating unit 232631 adds the absolute values of the reference coefficients to obtain the sum thereof (SA223), and quantizes the obtained sum to calculate an encoding parameter k (SA224). Next, by using the encoding parameter k calculated by the encoding parameter calculating unit 232631, the multidimensional coefficient amplitude decoding unit 23263 performs Golomb-Rice decoding of a code inputted from the code input device 24 into a value which is the result of subtracting N−1 from the absolute value of the coefficient HH (SA225). Further, at this step SA225, the multidimensional coefficient amplitude decoding unit 23263 adds N−1 to the decoded value and obtains the absolute value of the coefficient HH. Then, the process proceeds to step SA226.

At step SA226, the multidimensional coefficient plus/minus decoding unit 23262 determines whether or not the absolute value of the coefficient HH is zero. If not zero (N at step SA226), the multidimensional coefficient plus/minus decoding unit 23262 decodes a plus/minus sign of the coefficient HH from a code inputted from the code input device 24 (SA227), and the process proceeds to step SA228. If zero (Y at step SA226), the process skips step SA227 and proceeds to step SA228.

At step SA228, the coefficient group outputting unit 2325 outputs the HH coefficient value decoded by the coefficient decoding unit 232 to the horizontal and vertical decomposition coefficient memory 223. Then, the multidimensional variable-length decoding process is ended.

Figure 12:
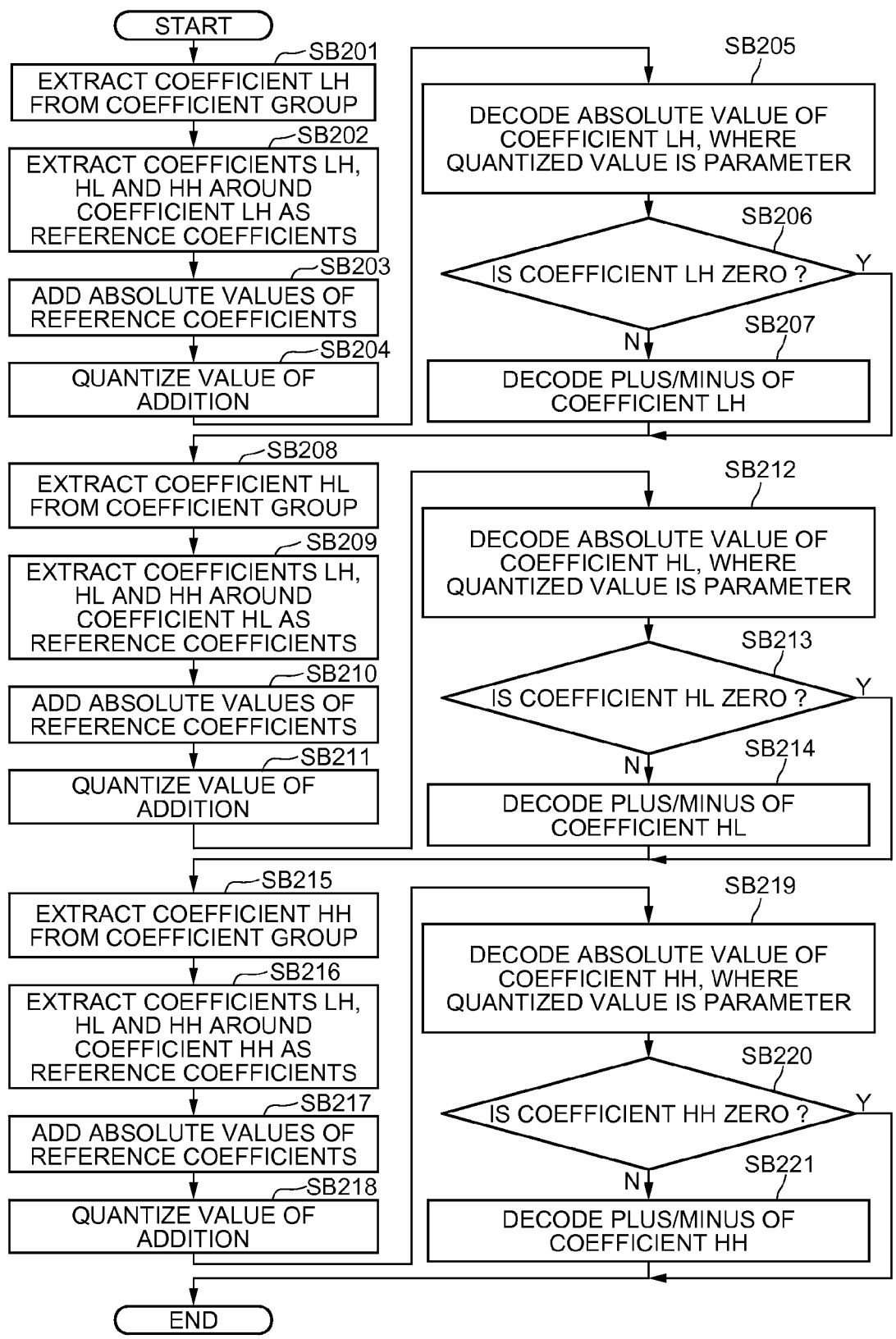
FIG. 12 is a flowchart showing a behavior of individual coefficient decoding in the wavelet transform decoding apparatus in accordance with the second exemplary embodiment of the present invention.

Next, referring to the block diagram of FIG. 9 and the flowchart of FIG. 12, a behavior of the individual coefficient decoding process (step S213 in FIG. 10) of this exemplary embodiment will be described in detail.

First, the target coefficient extracting unit 23281 extracts the coefficient LH from the coefficient group to be decoded this time by the coefficient decoding unit 232 (SB201). Next, the reference coefficient extracting unit 2327 extracts the reference coefficients for the coefficient LH (SB202). Next, the encoding parameter calculating unit 232821 adds the absolute values of the reference coefficients to obtain the sum (SB203) and quantizes the obtained sum to calculate an encoding parameter k (SB204). Next, by using the encoding parameter k calculated by the encoding parameter calculating unit 232821, the coefficient amplitude decoding unit 23282 performs Golomb-Rice coding of a code inputted from the code input device 24 into the absolute value of the coefficient LH (SB205).

Next, the coefficient plus/minus decoding unit 23283 determines whether or not the absolute value of the coefficient LH is zero (SB206). If not zero (N at step SB206), the coefficient plus/minus decoding unit 23283 decodes a plus/minus sign of the coefficient LH from a code inputted from the code input device 24 (SB207), and the process proceeds to step SB208. If zero (Y at step SB206), the process skips step SB107 and proceeds to step SB108.

At step SB208, the target coefficient extracting unit 23281 extracts the coefficient HL from the coefficient group to be decoded this time by the coefficient decoding unit 232. Next, the reference coefficient extracting unit 2327 extracts the reference coefficients for the coefficient HL (SB209). Next, the encoding parameter calculating unit 232821 adds the absolute values of the reference coefficients to obtain the sum (SB210), and quantizes the obtained sum to calculate an encoding parameter k (SB211). Next, by using the encoding parameter k calculated by the encoding parameter calculating unit 232821, the coefficient amplitude decoding unit 23282 performs Golomb-Rice coding of a code inputted from the code input device 24 into the absolute value of the coefficient HL (SB212).

Next, the coefficient plus/minus decoding unit 23283 determines whether or not the absolute value of the coefficient HL is zero (SB213). If not zero (N at step SB213), the coefficient plus/minus decoding unit 23283 decodes a plus/minus sign of the coefficient HL from a code inputted from the code input device 24 (SB214), and the process proceeds to step SB215. If zero (Y at step SB214), the process skips step SB214 and proceeds to step SB215.

At step SB215, the target coefficient extracting unit 23281 extracts the coefficient HH from the coefficient group to be decoded this time by the coefficient decoding unit 232 (SB215). Next, the reference coefficient extracting unit 2327 extracts the reference coefficients for the coefficient HH (SB216). Next, the encoding parameter calculating unit 232821 adds the absolute values of the reference coefficients to obtain the sum (SB217), and quantizes the obtained sum to calculate an encoding parameter k (SB218). Next, by using the encoding parameter k calculated by the encoding parameter calculating unit 232821, the coefficient amplitude decoding unit 23282 performs Golomb-Rice coding of a code inputted from the code input device 24 into the absolute value of the coefficient HH (SB219).

Next, the coefficient plus/minus decoding unit 23283 determines whether or not the coefficient HH is zero (SB220). If not zero (N at step SB220), the coefficient plus/minus decoding unit 23283 decodes a plus/minus sign of the coefficient HH from a code inputted from the code input device 24 (SB221), and the individual coefficient encoding process is ended. If zero (Y at step SB220), the process skips step SB221, and the individual coefficient encoding process is ended.

According to this exemplary embodiment, it is possible to appropriately decode data encoded in the first exemplary embodiment.

[Third Exemplary Embodiment]

This exemplary embodiment corresponds to a wavelet transform encoding apparatus that the function relating to the process in the run length mode is omitted from the wavelet transform encoding apparatus according to the first exemplary embodiment. Below, a description will be made focusing on a different point from the first exemplary embodiment.

{Explanation of Configuration}

Figure 13:
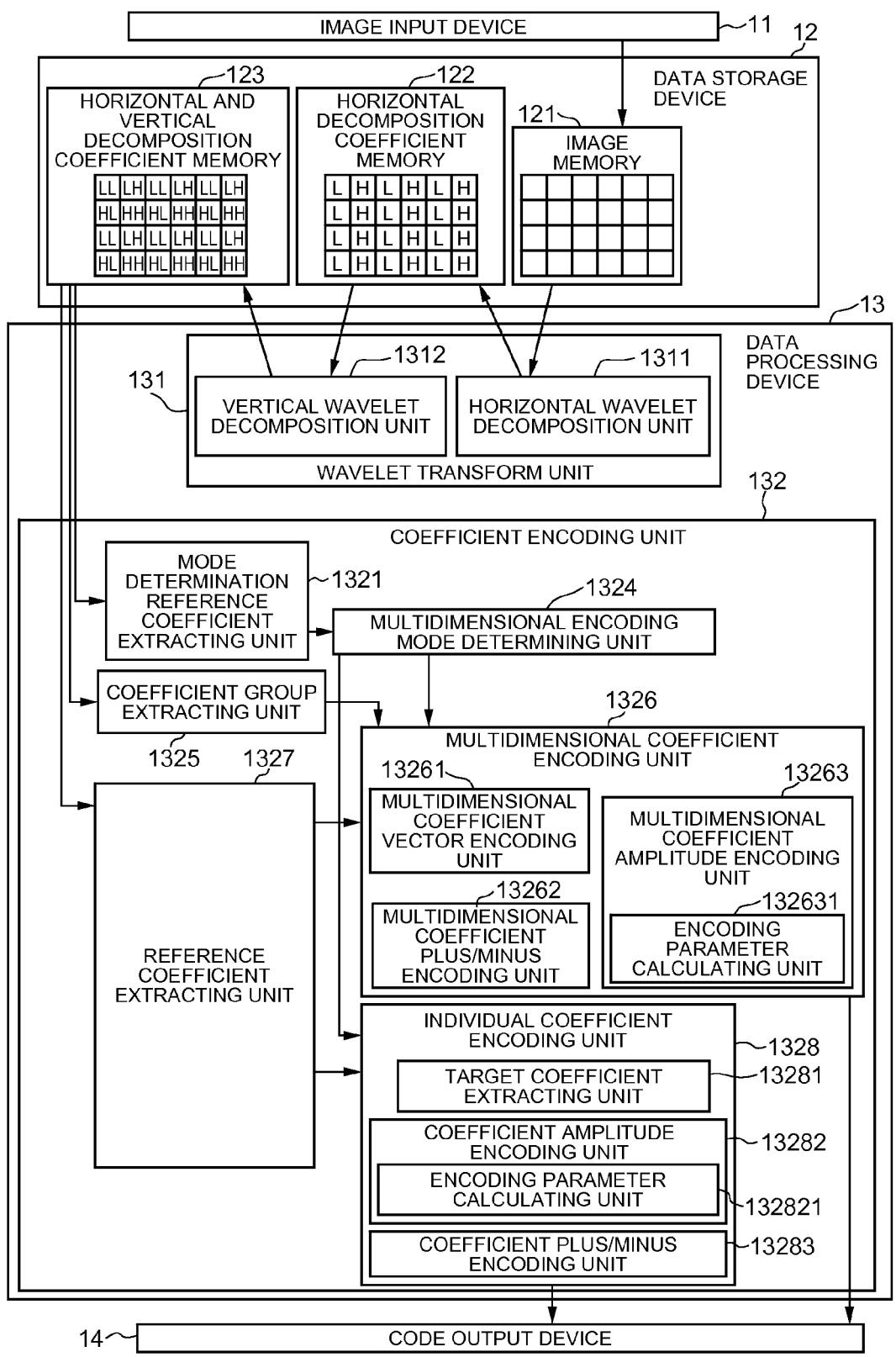
FIG. 13 is a block diagram of a wavelet transform encoding apparatus in accordance with a third exemplary embodiment of the present invention.

FIG. 13 is a block diagram of a wavelet transform encoding apparatus according to this exemplary embodiment. Referring to FIG. 13, the data storage device 12 has the image memory 121, the horizontal decomposition coefficient memory 122, and the horizontal and vertical decomposition coefficient memory 123. The run length memory 124 is omitted.

The coefficient encoding unit 132 of the data processing device 13 is comprised of the mode determination reference coefficient extracting unit 1321, the multidimensional encoding mode determining unit 1324, the coefficient group extracting unit 1325, the multidimensional coefficient encoding unit 1326, the reference coefficient extracting unit 1327, and the individual coefficient encoding unit 1328. The run length mode determining unit 1322 and the run length encoding unit 1323 are omitted. Moreover, the multidimensional coefficient vector encoding unit 13261 of the multidimensional coefficient encoding unit 1326 does not have the code table switching unit 132611.

{Explanation of Behavior}

Figure 14:
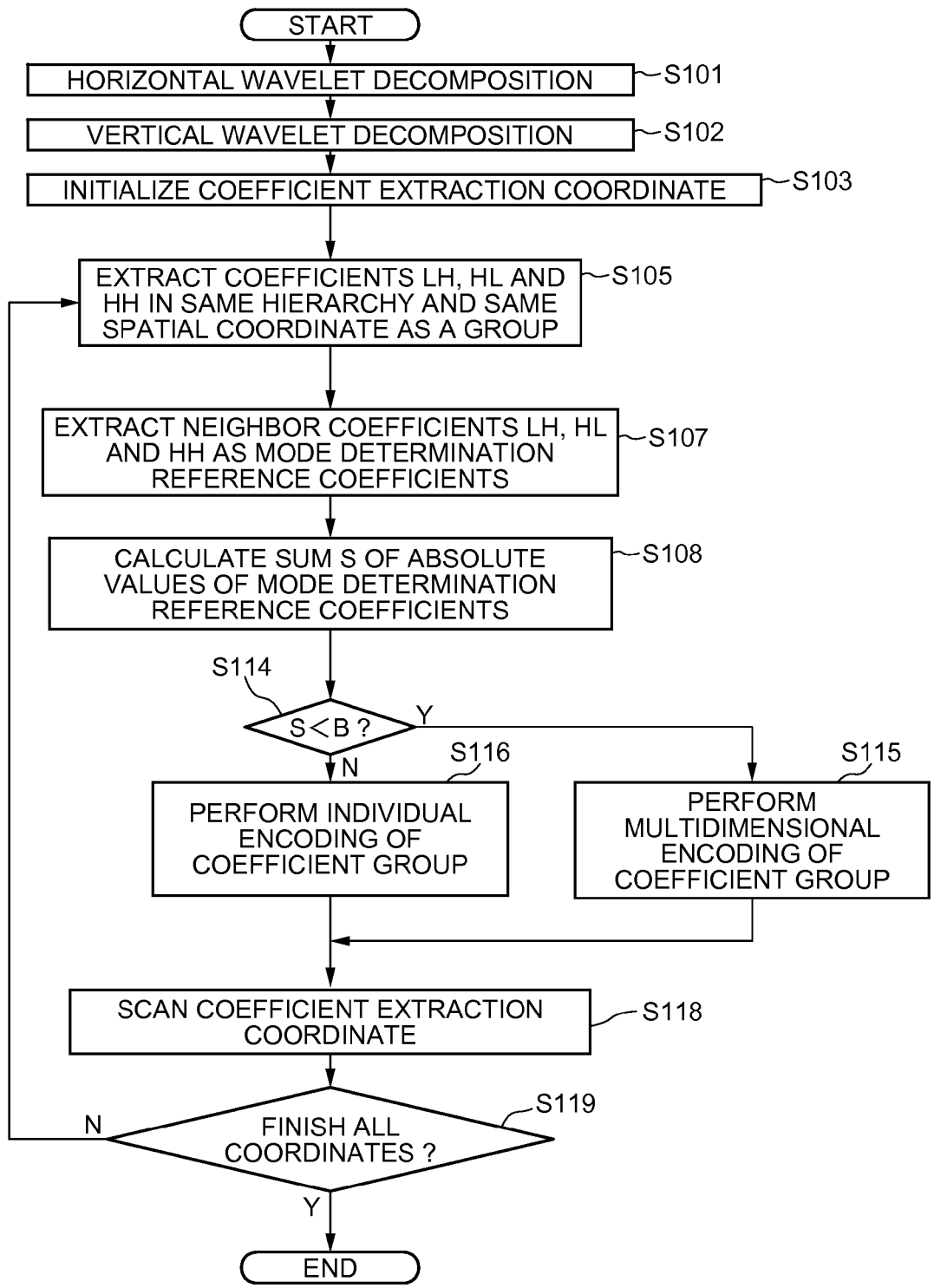
FIG. 14 is a flowchart showing an operation of the wavelet transform encoding apparatus in accordance with the third exemplary embodiment of the present invention.

An overall behavior of this exemplary embodiment will be described with reference to the block diagram of FIG. 13 and the flowchart of FIG. 14.

When an image is inputted from the image input device 11 into the image memory 121, the horizontal wavelet decomposition unit 1311 performs horizontal wavelet decomposition on the inputted image, and stores the acquired horizontal decomposition coefficients L and H into the horizontal decomposition coefficient memory 122 (S101). Subsequently, the vertical wavelet decomposition unit 1312 performs vertical wavelet decomposition on the horizontal decomposition coefficients stored in the horizontal decomposition coefficient memory 122, and stores the acquired wavelet transform coefficients LL, LH, HL and HH into the horizontal and vertical decomposition coefficient memory 123 (S102). Next, the coefficient encoding unit 132 initializes coefficient extraction coordinate to (0, 0) (S103). The behavior hereto is the same as in the first exemplary embodiment.

Next, the coefficient group extracting unit 1325 extracts the coefficients LH, HL and HH located in the coefficient extraction coordinate in the same wavelet hierarchy, as a coefficient group of the encoding target (S105).

Next, the mode determination reference coefficient extracting unit 1321 extracts wavelet transform coefficients to be referred to for discrimination of an encoding mode. Next, the multidimensional encoding mode determining unit 1324 obtains a sum S of the absolute values of the reference coefficients extracted by the mode determination reference coefficient extracting unit 1321 (S108). Next, the multidimensional encoding mode determining unit 1324 compares the sum S with a preset threshold B. In a case where S is less than B (Y at step S114), the process proceeds to step S115, and a multidimensional encoding process by the multidimensional coefficient encoding unit 1326 is performed. If not (N at step S114), the process proceeds to step S116, and an individual encoding process by the individual coefficient encoding unit 1328 is performed. In either process, the result of the encoding process is outputted to the code output device 14, and the process proceeds to step S118.

When the multidimensional variable-length encoding process or the individual encoding process ends, the coefficient encoding unit 132 scans the coefficient extraction coordinate to the next in a raster scanning order (S118), and determines whether or not encoding of all the groups of the wavelet transform coefficients LH, HL and HH of the high-frequency subbands is finished (S119). If not finished (N at step S119), the process moves back to the step S105 to repeat the same process as described hereinabove for the next group of the wavelet transform coefficients LH, HL and HH located spatially in the same coordinate in the respective high-frequency subbands. If the encoding process of all the groups of the wavelet transform coefficients LH, HL and HH is finished (Y at step S119), the process is ended.

Figure 15:
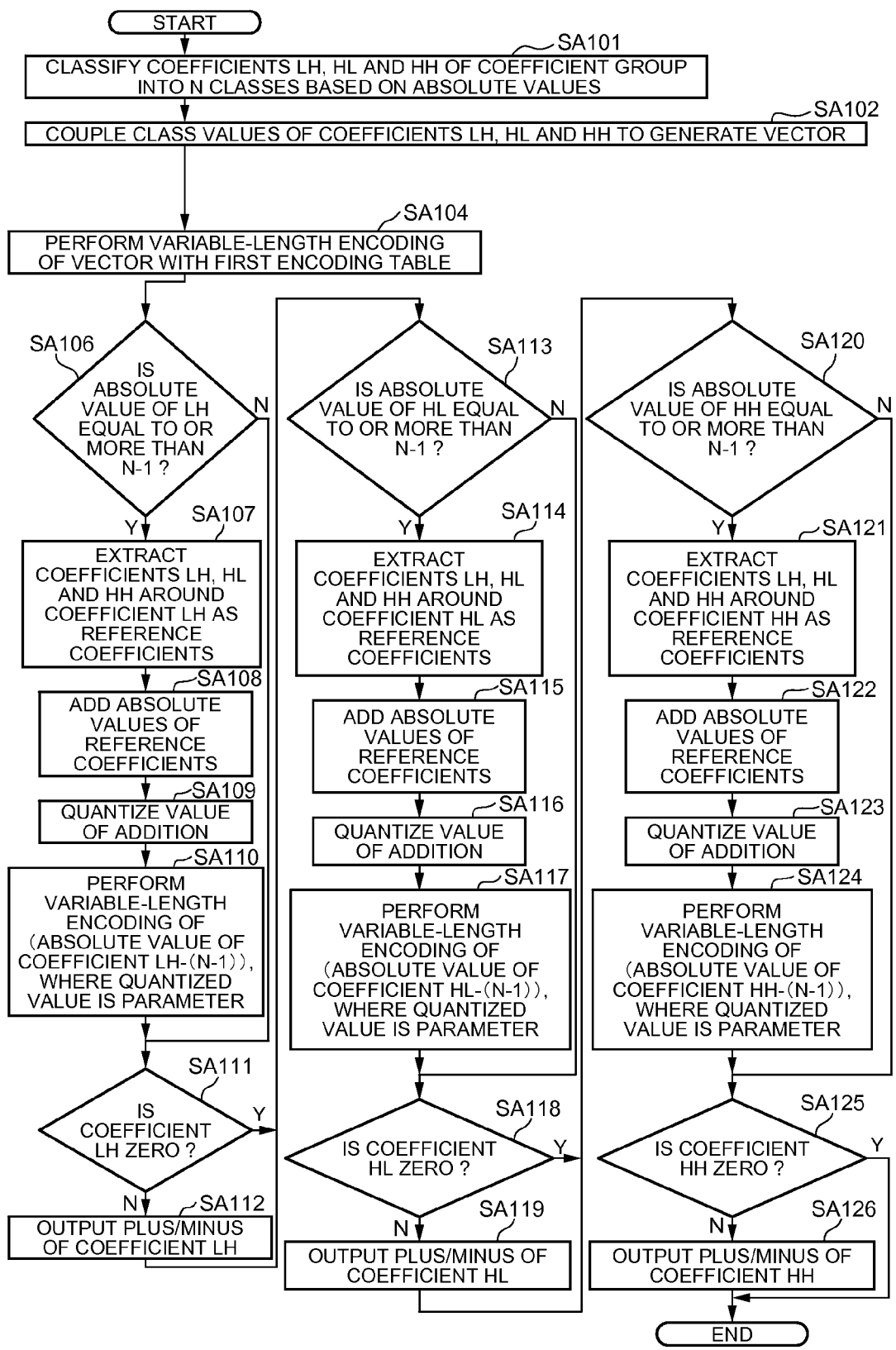
FIG. 15 is a flowchart showing an example of a multidimensional coefficient encoding process in the wavelet transform encoding apparatus in accordance with the third exemplary embodiment of the present invention.

Next, referring to the block diagram of FIG. 13 and the flowchart of FIG. 15, a behavior of the multidimensional variable-length encoding process (step S115 in FIG. 14) in this exemplary embodiment will be described in detail.

The multidimensional coefficient vector encoding unit 13261 classifies the absolute values of the coefficients LH, HL and HH of the coefficient group extracted by the coefficient group extracting unit 1325 into N classes in total (N≥3) including 0, 1, . . . , and N−1 or more (SA101). Further, the multidimensional coefficient vector encoding unit 13261 couples the class numbers of LH, HL and HH and generates a three-dimensional vector (SA102). The behavior hereto is the same as in the first exemplary embodiment.

Next, the multidimensional coefficient vector encoding unit 13261 encodes the three-dimensional vector by using a first encoding table (SA104).

Hereinafter, the same operation as at the steps SA106 to SA126 in the first exemplary embodiment is conducted.

The behavior of the individual coefficient encoding process (S116 in FIG. 14) in this exemplary embodiment is the same as that of the individual coefficient encoding process (S116 in FIG. 6) in the first exemplary embodiment.

Next, an effect of this exemplary embodiment will be described.

According to this exemplary embodiment, it is possible to perform encoding with high compression ratio on various two-dimensional signals such as a two-dimensional signal for which it is desirable to collectively encode a plurality of wavelet transform coefficients located spatially at the same position, a two-dimensional signal for which it is desirable to individually encode, and a two-dimensional signal containing both a portion for which it is desirable to collectively encode and a portion for which it is desirable to individually encode. This is because, for each group of a plurality of wavelet transform coefficients located spatially at the same position, it is determined whether to collectively encode or individually encode the plurality of wavelet transform coefficients based on the sum of the absolute values of a plurality of wavelet transform coefficients located spatially in the vicinity of the encoding target coefficient group, and therefore, correlated with the encoding target coefficient group.

[Fourth Exemplary Embodiment]

Next, a fourth exemplary embodiment of the present invention will be described referring to the accompanying drawings.

This exemplary embodiment corresponds to an apparatus which decodes the data encoded in the third exemplary embodiment. Moreover, this exemplary embodiment corresponds to a wavelet transform decoding apparatus that the function relating to the process in the run length mode is omitted from the wavelet transform decoding apparatus according to the second exemplary embodiment. Hereinafter, a description will be made focusing on a different point from the second exemplary embodiment.

{Explanation of Configuration}

Figure 16:
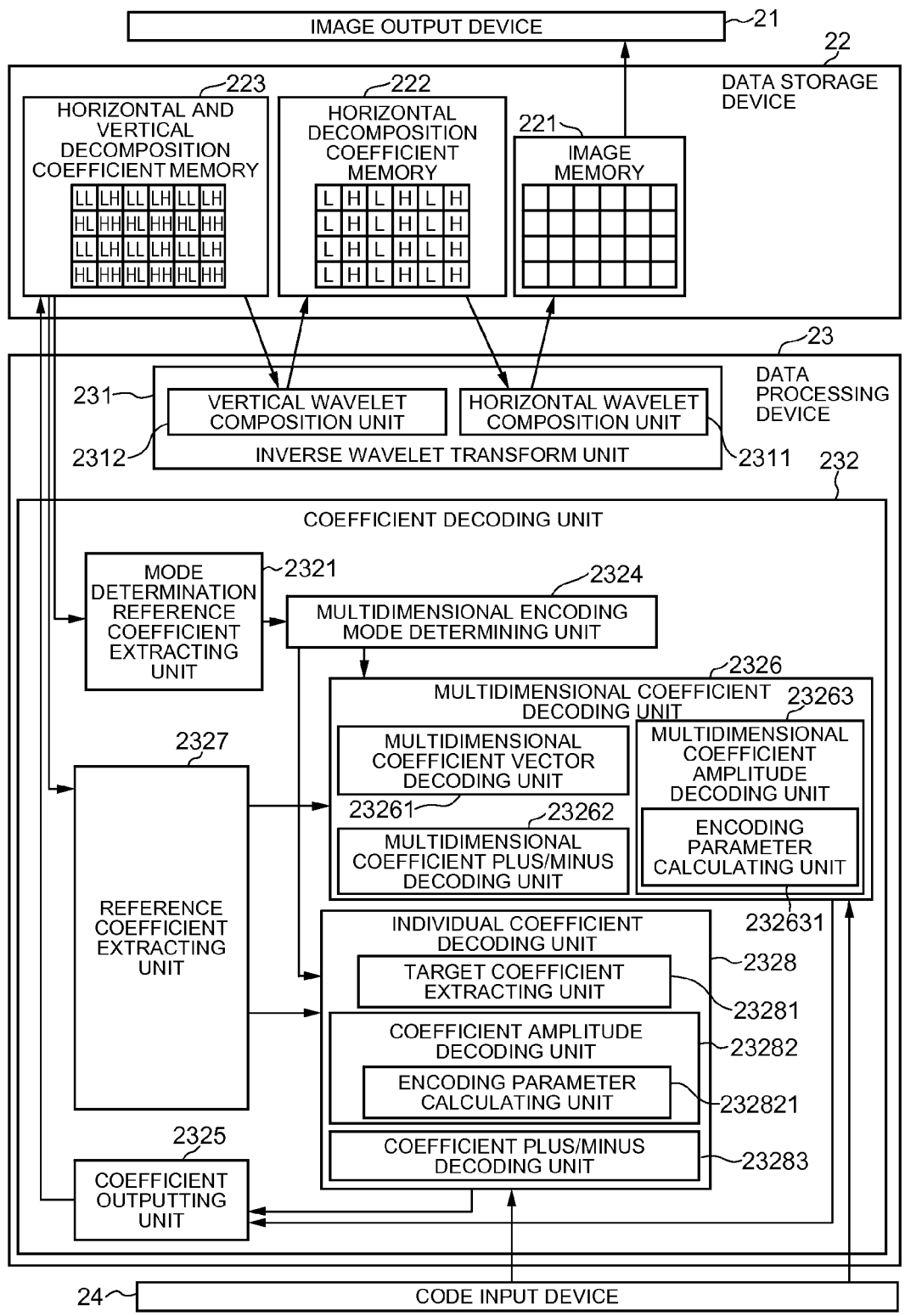
FIG. 16 is a block diagram of a wavelet transform decoding apparatus in accordance with a fourth exemplary embodiment of the present invention.

FIG. 16 is a block diagram of a wavelet transform decoding apparatus according to this exemplary embodiment. Referring to FIG. 16, the data storage device 22 has the image memory 221, the horizontal decomposition coefficient memory 222, and the horizontal and vertical decomposition coefficient memory 223. The run length memory 224 is omitted.

The coefficient decoding unit 232 of the data processing device 23 is comprised of the mode determination reference coefficient extracting unit 2321, the multidimensional encoding mode determining unit 2324, the coefficient outputting unit 2325, the multidimensional coefficient decoding unit 2326, the reference coefficient extracting unit 2327, and the individual coefficient decoding unit 2328. The run length mode determining unit 2322 and the run length decoding unit 2323 are omitted. Moreover, the multidimensional coefficient vector decoding unit 23261 of the multidimensional coefficient decoding unit 2326 does not have the code table switching unit 232611.

{Explanation of Behavior}

Figure 17:
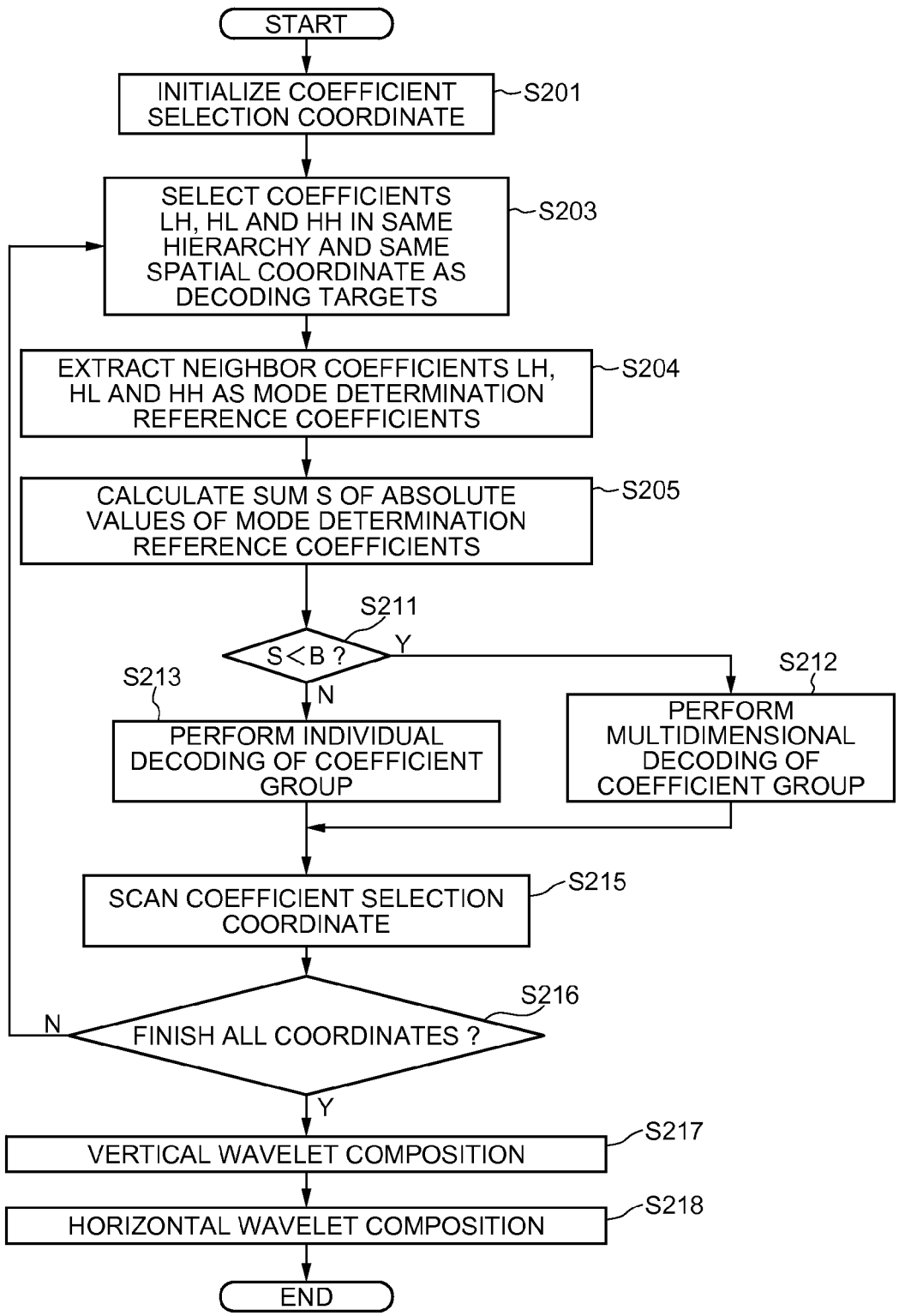
FIG. 17 is a flowchart showing an operation of the wavelet transform decoding apparatus in accordance with the fourth exemplary embodiment of the present invention.

Referring to the block diagram of FIG. 16 and the flowchart of FIG. 17, an overall behavior of this exemplary embodiment will be described focusing on a different point from the second exemplary embodiment.

Firstly, the coefficient decoding unit 232 initializes the selection coordinate of a decoding target coefficient group to (0, 0) (S201). Next, the coefficient decoding unit 232 selects a group of a plurality of wavelet transform coefficients LH, HL and HH located spatially at the same position within a plurality of high-frequency subbands belonging to the same hierarchy, as a coefficient group of the decoding target (S203).

Next, the mode determination reference coefficient extracting unit 2321 extracts wavelet transform coefficients to be referred to for discrimination of an encoding mode (S204). Next, the multidimensional encoding mode determining unit 2324 calculates the sum S of the absolute values of the mode determination reference coefficients having been extracted above (S205). Next, the multidimensional encoding mode determining unit 2324 compares this sum S with a preset threshold B. In a case where S is less than B (Y at step S211), a multidimensional decoding process by the multidimensional coefficient decoding unit 2326 is performed (S212). If not (N at step S211), the process proceeds to step S213, and an individual decoding process by the individual coefficient decoding unit 2328 is performed. In either case, the coefficient outputting unit 2325 outputs the decoded coefficient value to the horizontal and vertical decomposition coefficient memory 223.

When the multidimensional variable-length decoding process or the individual decoding process ends, the coefficient decoding unit 232 scans the coefficient selection coordinate to the next coordinate in a raster scanning order (S215), and determines whether or not decoding of all the groups of the wavelet transform coefficients LH, HL and HH of the high-frequency subbands is finished (S216). If not finished (N at step S216), the process moves back to the step S203 to repeat the same process as described hereinabove for the next group of the wavelet transform coefficients LH, HL and HH located spatially in the same coordinate in the respective high-frequency subbands. If the decoding process on all the groups of the wavelet transform coefficients LH, HL and HH is finished (Y at step S216), the process proceeds to step S217.

At step S217 and step S218, the same processes as at the step S217 and step S218 in the second exemplary embodiment are performed by the vertical wavelet composition unit 2312 and the horizontal wavelet composition unit 2311.

Figure 18:
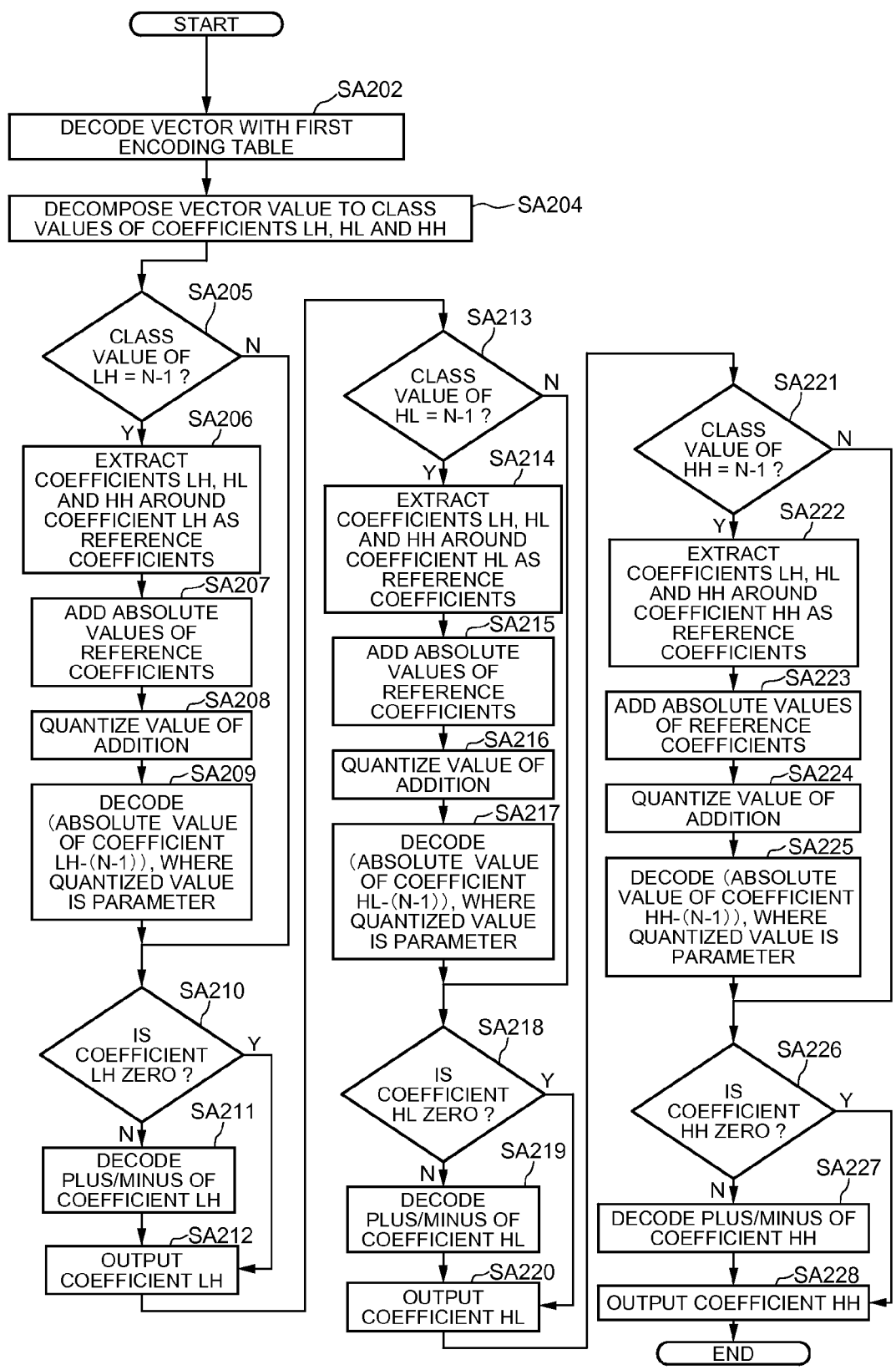
FIG. 18 is a flowchart showing a behavior of multidimensional variable-length decoding in the wavelet transform decoding apparatus in accordance with the fourth exemplary embodiment of the present invention.

Next, referring to the block diagram of FIG. 16 and the flowchart of FIG. 18, a behavior of the multidimensional variable-length decoding process (step S212 in FIG. 17) in this exemplary embodiment will be described focusing on a different point from the second exemplary embodiment.

First, the multidimensional coefficient vector decoding unit 23261 decodes a three-dimensional vector by using a first encoding table (SA202). Hereinafter, the same operation as at the steps SA204 to SA228 in the second exemplary embodiment is performed.

The behavior of the coefficient group individual decoding process (S213 in FIG. 17) in this exemplary embodiment is the same as the coefficient group individual decoding process (S213 in FIG. 6) in the second exemplary embodiment.

According to this exemplary embodiment, it is possible to appropriately decode the data encoded in the third exemplary embodiment.

Hereinbefore, the exemplary embodiments of the present invention are described, but the present invention is not limited to the exemplary embodiments described above and can be modified and changed in various manners. For example, in each of the exemplary embodiments described above, the value of N in multidimensional coefficient vector encoding and decoding is set to 3 or more, but the value of N may be set to 2 or more. Moreover, the present invention allows its function to be realized not only by hardware but also by a computer and a program. The program is recorded on a computer-readable recording medium such as a magnetic disk and a semiconductor memory, and retrieved by the computer when, for example, the computer is started up. Then, the program controls the behavior of the computer, thereby causing the computer to function as the respective units in each of the exemplary embodiments described above and cause the computer to perform the processes in each of the exemplary embodiments.

The present invention is based upon and claims the benefit of priority from Japanese patent application No. 2012-160783, filed on Jul. 19, 2012, the disclosure of which is incorporated herein in its entirety by reference.

INDUSTRIAL APPLICABILITY

The present invention can be used for efficient accumulation or transmission of image data of a digital camera, a digital video camera, or the like.

DESCRIPTION OF REFERENCE NUMERALS 11 image input device
12 data storage device
13 data processing device
14 code output device
121 image memory
122 horizontal decomposition coefficient memory
123 horizontal and vertical decomposition coefficient memory
124 run length memory
131 wavelet transform unit
1311 horizontal wavelet transform unit
1312 vertical wavelet transform unit
1321 mode determination reference coefficient extracting unit
1322 run length mode determining unit
1323 run length encoding unit
1324 multidimensional encoding mode determining unit
1325 coefficient group extracting unit
1326 multidimensional coefficient encoding unit
13261 multidimensional coefficient vector encoding unit
132611 code table switching unit
13262 multidimensional coefficient plus/minus encoding unit
13263 multidimensional coefficient amplitude encoding unit
132631 encoding parameter calculating unit
1327 reference coefficient extracting unit
1328 individual coefficient encoding unit
13281 target coefficient extracting unit
13282 coefficient amplitude encoding unit
132821 encoding parameter calculating unit
13283 coefficient plus/minus encoding unit
21 image output device
22 data storage device
23 data processing device
24 code input device
221 image memory
222 horizontal decomposition coefficient memory 223 horizontal and vertical decomposition coefficient memory
224 run length memory
231 inverse wavelet transform unit
2311 horizontal wavelet composition unit
2312 vertical wavelet composition unit
2321 mode determination reference coefficient extracting unit
2322 run length mode determining unit
2323 run length decoding unit
2324 multidimensional encoding mode determining unit
2325 coefficient outputting unit
2326 multidimensional coefficient decoding unit
23261 multidimensional coefficient vector decoding unit
232611 code table switching unit
23262 multidimensional coefficient plus/minus decoding unit
23263 multidimensional coefficient amplitude decoding unit
232631 encoding parameter calculating unit
2327 reference coefficient extracting unit
2328 individual coefficient decoding unit
23281 target coefficient extracting unit
23282 coefficient amplitude decoding unit
232821 encoding parameter calculating unit
23283 coefficient plus/minus decoding unit

What is claimed is:

1. A wavelet transform encoding apparatus comprising:
a decomposer for decomposing a two-dimensional signal into subbands, which are a plurality of frequency regions; and
a coefficient encoder for encoding wavelet transform coefficients of the subbands,
wherein the coefficient encoder includes:
a coefficient group extractor for extracting, as a coefficient group, a group of a plurality of wavelet transform coefficients located spatially at same positions from LH, HL and HH subbands belonging to a same hierarchy;
a multidimensional coefficient encoder for collectively encoding the plurality of wavelet transform coefficients included in the extracted coefficient group;
an individual coefficient encoder for individually encoding the plurality of wavelet transform coefficients included in the extracted coefficient group;
a mode determination reference coefficient extractor for extracting, as a mode determination reference coefficient group, a group of a plurality of already-encoded wavelet transform coefficients located spatially in neighborhood of the extracted coefficient group from the LH, HL and HH subbands belonging to the same hierarchy; and
a comparer for comparing a sum of absolute values of the plurality of wavelet transform coefficients included in the extracted mode determination reference coefficient group with a predetermined first threshold, and determining whether to use the multidimensional coefficient encoder or the individual coefficient encoder to encode the plurality of wavelet transform coefficients included in the extracted coefficient group.

2. The wavelet transform encoding apparatus according to claim 1, wherein the comparer compares the sum of the absolute values of the plurality of wavelet transform coefficients included in the extracted mode determination reference coefficient group with a second threshold set to a smaller value than the first threshold, determines whether or not to enter a run length mode and, when determining not to enter the run length mode and when exiting the run length mode, performs the determination whether to use the multidimensional coefficient encoder or the individual coefficient encoder to encode,
the wavelet transform encoding apparatus further comprising a run length encoder for, in the run length mode, counting frequency of successive appearance of a group that all the wavelet transform coefficients included in the coefficient group are 0 as a run length and, when any of the wavelet transform coefficients included in the coefficient group becomes non-zero, encoding the run length and exiting from the run length mode.

3. The wavelet transform encoding apparatus according to claim 2, wherein the multidimensional coefficient encoder has a plurality of variable-length code tables of different types, selects one variable-length code table from among the plurality of variable-length code tables based on whether or not encoding is to be performed immediately after the run length mode is exited, and performs encoding by using the selected variable-length code table.

4. The wavelet transform encoding apparatus according to claims 1, wherein assuming coordinates of wavelet transform coefficients LH, HL and HH of encoding targets are (i, j), the mode determination reference coefficient extractor extracts:
(1) a wavelet transform coefficient LH of a coordinate value (i, j−1);
(2) a wavelet transform coefficient HL of a coordinate value (i, j−1);
(3) a wavelet transform coefficient HH of a coordinate value (i, j−1);
(4) a wavelet transform coefficient LH of a coordinate value (i−1, j);
(5) a wavelet transform coefficient HL of a coordinate value (i−1, j); and
(6) a wavelet transform coefficient HH of a coordinate value (i−1, j).

5. The wavelet transform encoding apparatus according to claim 1, wherein the multidimensional coefficient encoder includes:
a multidimensional coefficient vector encoder for classifying each of the plurality of wavelet transform coefficients into any of N classes (N≥3) in total and performing variable-length encoding of a vector which is a combination of class numbers of the classes where the plurality of wavelet transform coefficients belong, the N classes including (N−1) classes where absolute values are 0, 1, . . . , (N−2) and a difference of absolute values between adjacent classes is 1 and a class where an absolute value is N−1 or more;
a multidimensional coefficient plus and minus encoder for encoding information of plus and minus of the wavelet transform coefficient with an absolute value of non-zero; and
a multidimensional coefficient amplitude encoder for, regarding the wavelet transform coefficient with an absolute value of N−1 or more, performing variable-length encoding of a value obtained by subtracting N−1 from the absolute value.

6. The wavelet transform encoding apparatus according to claim 5, wherein the multidimensional coefficient amplitude encoder calculates an encoding parameter of a wavelet transform coefficient of an encoding target based on a plurality of already-encoded neighbor wavelet transform coefficients within a plurality of high-frequency subbands belonging to a same hierarchy, and performs the variable-length encoding by using the calculated encoding parameter.

7. The wavelet transform encoding apparatus according to claim 6, wherein when the coefficient group includes a plurality of wavelet transform coefficients with absolute values of N−1 or more, the multidimensional coefficient amplitude encoder encodes a wavelet transform coefficient LH, a wavelet transform coefficient HL and a wavelet transform coefficient HEI in this order in the coefficient group.

8. The wavelet transform encoding apparatus according to claim 1, wherein the individual coefficient encoder includes:
a coefficient amplitude encoder for calculating an encoding parameter of the wavelet transform coefficient of an encoding target based on a plurality of already-encoded neighbor wavelet transform coefficients within a plurality of high-frequency subbands belonging to a same hierarchy, and performing the variable-length encoding by using the calculated encoding parameter; and
a coefficient plus and minus encoder for encoding information of plus and minus of the wavelet transform coefficients with absolute values of non-zero among the wavelet transform coefficients of encoding targets.

9. The wavelet transform encoding apparatus according to claim 8, wherein the individual coefficient encoder encodes a wavelet transform coefficient LH, a wavelet transform coefficient HL and a wavelet transform coefficient HH in this order within the coefficient group.

10. The wavelet transform encoding apparatus according to claim 6, wherein in calculation of the encoding parameter, assuming coordinates of wavelet transform coefficients LH, HL and HH of encoding targets are (i, j):
for the wavelet transform coefficient LH:
a wavelet transform coefficient LH of a coordinate value (i, j-1);
a wavelet transform coefficient HL of a coordinate value (i, j-1);
a wavelet transform coefficient HH of a coordinate value (i, j-1); and
a wavelet transform coefficient LH of a coordinate value (i-1, j) are referred to;
for the wavelet transform coefficient HL:
a wavelet transform coefficient HL of a coordinate value (i, j-1);
a wavelet transform coefficient HL of a coordinate value (i-1, j);
a wavelet transform coefficient HH of a coordinate value (i-1, j); and
a wavelet transform coefficient LH of a coordinate value (i, j) are referred to; and
for the wavelet transform coefficient HH:
a wavelet transform coefficient HH of a coordinate value (i, j-1);
a wavelet transform coefficient HH of a coordinate value (i-1, j);
a wavelet transform coefficient LH of a coordinate value (i, j); and
a wavelet transform coefficient HL of a coordinate value (i, j) are referred to.

11. The wavelet transform encoding apparatus according to claim 2, wherein the multidimensional coefficient encoder includes:
a multidimensional coefficient vector encoder for classifying each of the plurality of wavelet transform coefficients into any of three classes where absolute values are 0, 1, and 2 or more, and performing variable-length encoding of a vector which is a combination of class numbers of the classes where the plurality of wavelet transform coefficients belong;
a multidimensional coefficient plus and minus encoder for encoding information of plus and minus of the wavelet transform coefficient with an absolute value of 1 or more; and
a multidimensional coefficient amplitude encoder for, regarding the wavelet transform coefficient with an absolute value of 2 or more, performing variable-length encoding of a value obtained by subtracting 2 from the absolute value.

12. A wavelet transform encoding method, performed by a data processing device, comprising:
decomposing a two-dimensional signal into subbands, which are a plurality of frequency regions; and
encoding wavelet transform coefficients of the subbands,
wherein the encoding of the wavelet transform coefficients of the subbands includes:
extracting, as a coefficient group, a group of a plurality of wavelet transform coefficients located spatially at same positions from LH, HL and HH subbands belonging to a same hierarchy;
extracting, as a mode determination reference coefficient group, a group of a plurality of already-encoded wavelet transform coefficients located spatially in neighborhood of the extracted coefficient group from the LH, HL and HH subbands belonging to the same hierarchy;
comparing a sum of absolute values of the plurality of wavelet transform coefficients included in the extracted mode determination reference coefficient group with a predetermined first threshold, and determining whether to use a multidimensional coefficient encoding method or an individual coefficient encoding method to encode the plurality of wavelet transform coefficients included in the extracted coefficient group;
when it is determined to encode by the multidimensional coefficient encoding method, collectively encoding the plurality of wavelet transform coefficients included in the extracted coefficient group; and
when it is determined to encode by the individual coefficient encoding method, individually encoding the plurality of wavelet transform coefficients included in the extracted coefficient group.

13. A non-transitory computer-readable medium storing a program comprising instructions for causing a computer to perform operations including:
decomposing a two-dimensional signal into subbands, which are a plurality of frequency regions; and
encoding wavelet transform coefficients of the subbands,
wherein the encoding wavelet transform coefficients of the subbands includes:
extracting, as a coefficient group, a group of a plurality of wavelet transform coefficients located spatially at same positions from LH, HL and HH subbands belonging to a same hierarchy;
extracting, as a mode determination reference coefficient group, a group of a plurality of already-encoded wavelet transform coefficients located spatially in neighborhood of the extracted coefficient group from the LH, HL and HH subbands belonging to the same hierarchy;
comparing a sum of absolute values of the plurality of wavelet transform coefficients included in the extracted mode determination reference coefficient group with a predetermined first threshold, and determining whether to use a multidimensional coefficient encoding method or an individual coefficient encoding method to encode the plurality of wavelet transform coefficients included in the extracted coefficient group;

when it is determined to encode by the multidimensional coefficient encoding method, collectively encoding the plurality of wavelet transform coefficients included in the extracted coefficient group; and when it is determined to encode by the individual coefficient encoding method, individually encoding the plurality of wavelet transform coefficients included in the extracted coefficient group.

* * * * *